July 29, 1941. F. W. COTTERMAN 2,250,889
TRANSMISSION GEARING
Filed Jan. 11, 1940 4 Sheets-Sheet 2
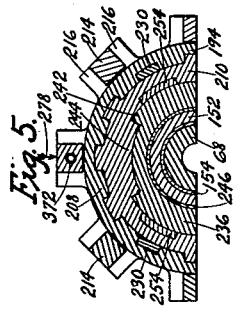
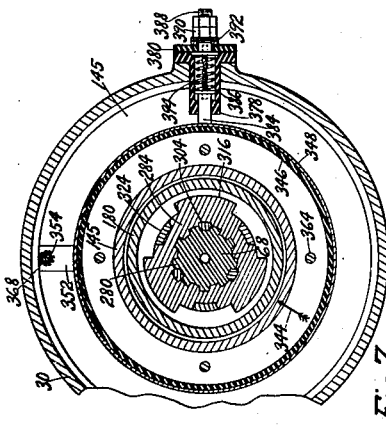
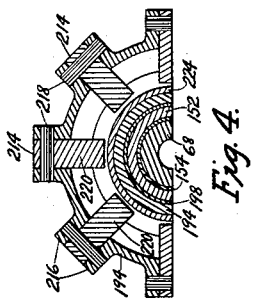
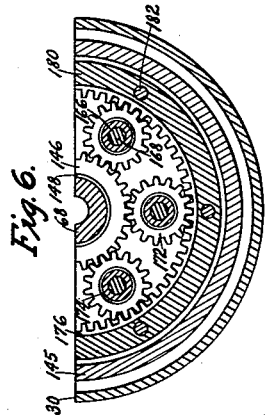
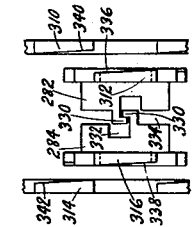
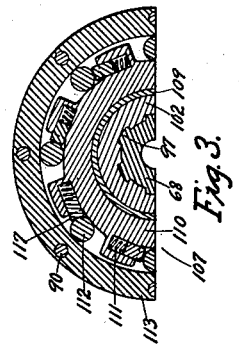
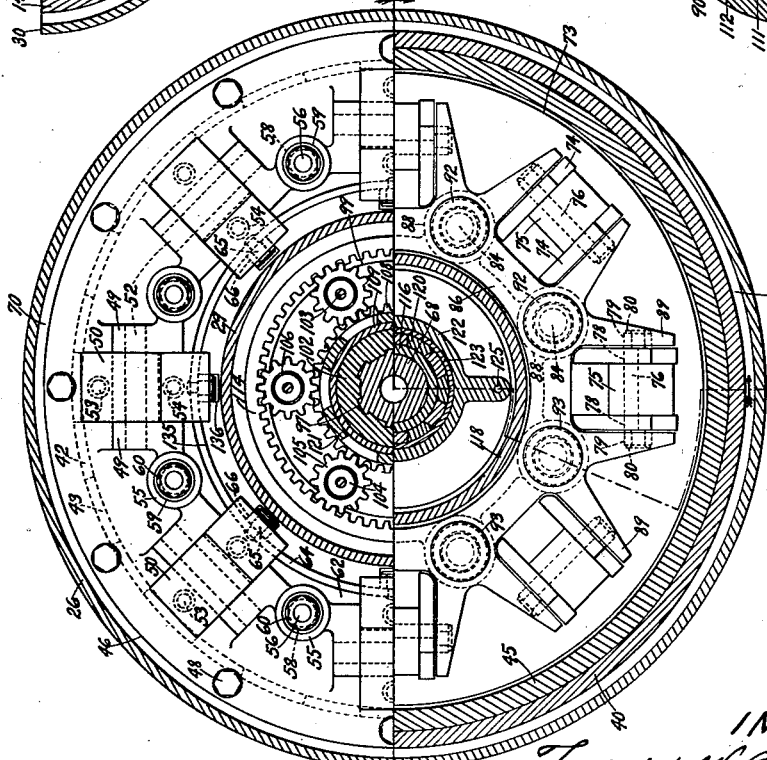
INVENTOR
Frederick W. Cotterman

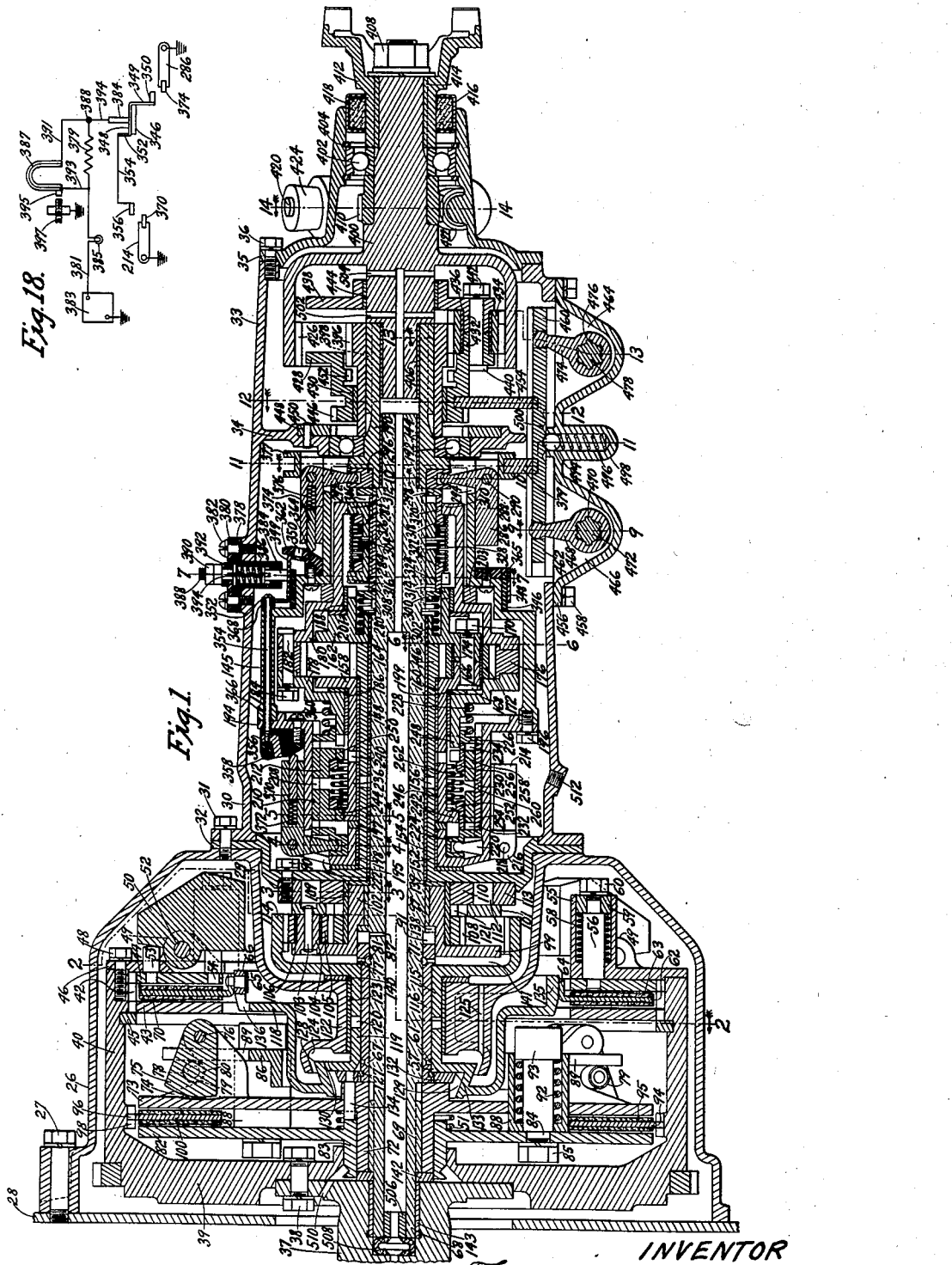

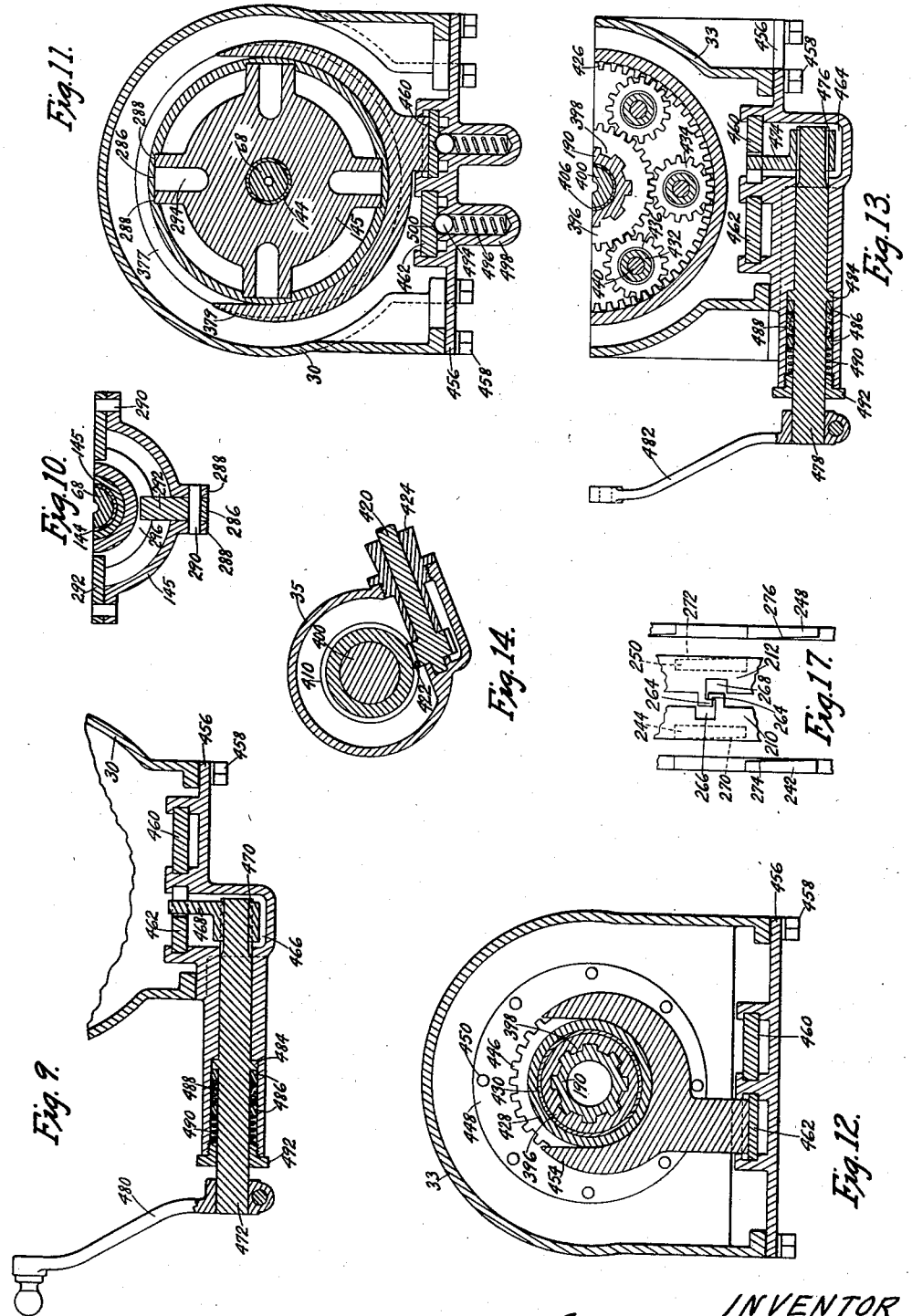

July 29, 1941.    F. W. COTTERMAN    2,250,889
TRANSMISSION GEARING
Filed Jan. 11, 1940    4 Sheets-Sheet 4
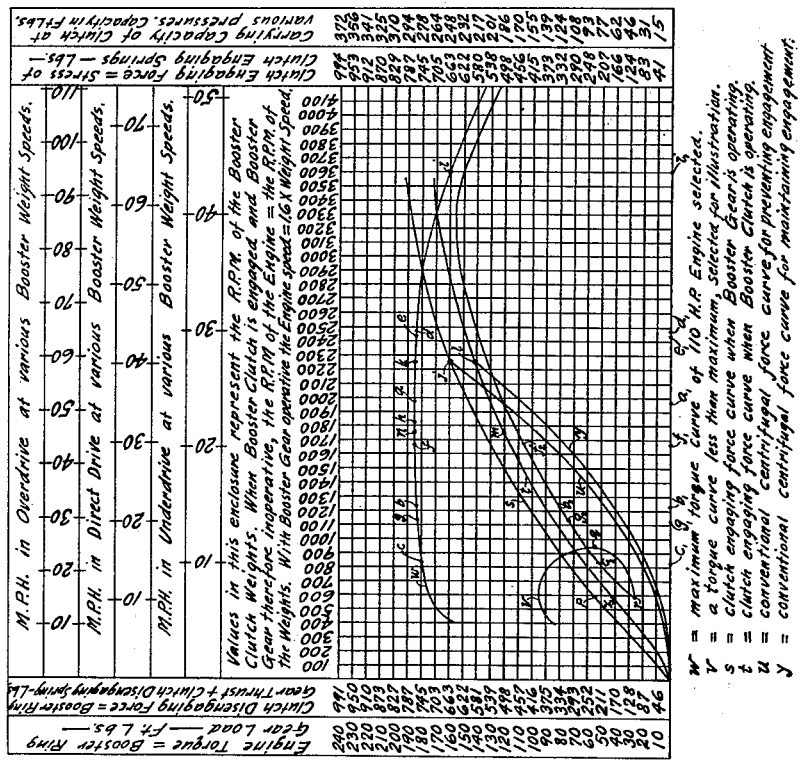
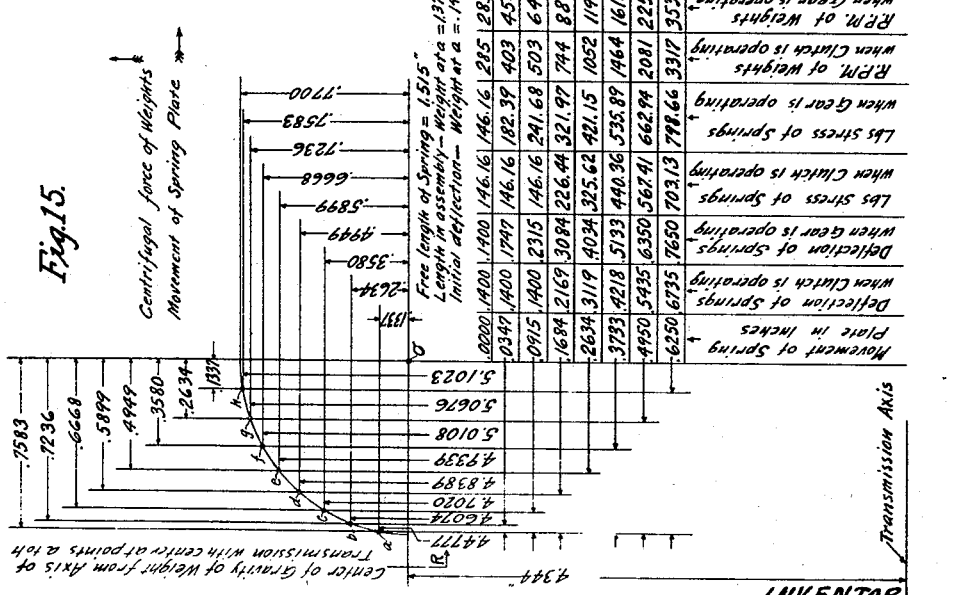
INVENTOR
Frederick W. Cotterman Patented July 29, 1941

2,250,889

UNITED STATES PATENT OFFICE 2,250,889

TRANSMISSION GEARING

Frederick W. Cotterman, Dayton, Ohio, assignor of one-half to Bessie D. Apple, Dayton, Ohio Application January 11, 1940, Serial No. 313,375

15 Claims. (Cl. 74—260)

This invention relates to transmission gearing and is particularly applicable to motor vehicles, part of the mechanism employed being substantially shown in my copending application Serial No. 257,059, filed February 18, 1939.

An object of the invention is to provide transmission gearing having six forward gear ratios with the highest ratio an overdrive, together with clutch mechanism for connecting the engine to the transmission, all fully automatic and occupying no greater space than commercial hand shift devices of equal range and capacity.

Another object is to so construct and arrange the transmission gearing and clutch mechanism that if the mechanism is operating in either underdrive, direct, or overdrive ratios and there arises a need for more power than the engine can deliver at the then existing speed, a step down in ratio will automatically take place to allow the engine to rise to a more appropriate speed.

Another object is to provide a transmission gear set comprising a sun gear, a ring gear, planet pinions and carrier, with speed responsive clutch means to connect the several elements variously between the input and output members to provide underdrive, direct and overdrive ratios, and a booster gear set also comprising a sun gear, a ring gear, planet pinions and carrier, with means responsive to both speed and torque to connect the booster gear set in series with the transmission gear set, whereby a step down or a step up of one speed is always had when speed-load conditions warrant, no matter in which of its several ratios the transmission gear is then operating, whereby the device is also subject to the will of the driver, in that he may by suddenly changing the amount of applied power by means of the engine accelerator, cause a shift up or down as the case may be.

Another object is to provide the transmission gear set with two positive clutches, the first being on the transmission output member and normally clutching the carrier and the second on the transmission input member and normally clutching the ring gear, whereby the transmission gear set acts as a speed reducing device or underdrive, the first clutch being operable at a relatively low predetermined speed to release the carrier and clutch the ring gear, whereby both input member and output member will be clutching the ring gear to provide a direct drive ratio, and the second clutch being operable at a higher predetermined speed to release the ring gear and clutch the carrier, whereby the gearing acts as a speed increasing device or overdrive, the sun gear being at all times fixedly secured against rotation.

Another object is to so construct the clutch mechanism of the transmission gear set that there will be positive two-direction driving connections between the several elements, in underdrive, in direct drive, and in overdrive, and so that when a shift from one ratio to the other is taking place, the clutches, both of which are operative to release one element and clutch a second, always clutch the said second before they release the first, to the end that there will be no free wheeling, either in underdrive, direct, or overdrive, or during the transition period in the shift from any one ratio to another.

Another object is to provide a main engine clutch, responsive to the speed of the engine, to connect the engine to the transmission input member through the booster gear, and an auxiliary engine clutch, responsive to the speed of the vehicle to connect the engine to the transmission input member directly and independently of the booster gear, whereby, if the vehicle is coasting while the engine is dead or is idling, the engine will be connected for engine braking at a low vehicle speed by said auxiliary clutch.

Another object is to so construct and arrange the gear mechanism with respect to the main and auxiliary engine clutches, that the engine clutches will be contained in an entirely separate housing from the gears, whereby the gears may be fully lubricated and the engine clutches may be kept dry, to the end that dry plate clutches, which have been proven the most adaptable, may be employed.

Another object is to so construct the main engine clutch that its engagement secures the ring gear of the booster gear set to the engine, then connect the carrier to the transmission input member and provide a one way brake to prevent backward rotation of the sun gear, to the end that, whenever the main clutch engages, engine power at reduced speed will be transmitted thru the ring gear to the carrier and therefore to the transmission input member.

Another object is to provide, in the booster gear set, gearing with helical teeth, so angled that the tangential load carried by the gearing causes an end thrust in a direction proper for disengaging the auxiliary engine clutch, with proper means to apply the end thrust to the auxiliary engine clutch to disengage it and keep it fully disengaged as long as the booster gear is transmitting power, to the end that no dragging action may be present in the auxiliary clutch by partial or insufficient engaging pressure.

Another object is to provide, in both the engine clutches and the transmission clutches, means for causing the centrifugal weights of a set to all move together, to the end that no one weight of a set may move outwardly ahead of the others and thereby cause an unbalanced effect.

Another object is to so arrange the connection between the main engine clutch and the booster ring gear that, altho the ring gear is connected to be rotated, it may nevertheless move axially by load on its helical teeth, to the end that the axial pressure of the ring gear which will vary with the torque being transmitted, may delay engagement of the auxiliary engine clutch which eliminates the drive thru the booster gear.

Another object is to so construct the auxiliary engine clutch that it is normally disengaged, and place its speed responsive mechanism on a vehicle driven member, whereby, starting of the vehicle from rest will always be done thru the booster gear, altho the length of time the booster gear will continue in effect will depend on the balance between the end thrust of the ring gear and the vehicle driven speed responsive means of the auxiliary clutch.

Another object is to provide for the auxiliary engine clutch, which engages to eliminate the booster gear, a resilient means normally inoperative to engage the clutch, and centrifugal weight means rotated in proportion to vehicle speed and normally adapted, at a low vehicle speed, to first apply said resilient means to urge engagement of said clutch, then further stress the resilient means to more strongly urge clutch engagement as the vehicle speed increases, whereby the speed at which the axial thrust of the booster ring gear may be overcome, and the booster gear eliminated, will vary with the torque being transmitted by said gear.

Another object is to so construct the resilient means and the centrifugal weight means of the auxiliary engine clutch that the force of the weights will be applied to stress the resilient means thru a leverage which becomes progressively less effective as the speed increases, whereby the stress of the resilient clutch engaging means will increase at a rate which is less than directly proportional to the R. P. M. instead of at a rate proportional to the square of the R. P. M. as it does where the force of centrifugal weight means is applied directly, or thru an unvarying leverage, as in common practice, to the end that sufficient clutch engaging pressure may be had at the lower speeds without having too great a clutch engaging pressure at the higher speeds.

Another object is to so construct the clutch mechanism which controls the booster gear that direct drive will always be fully accomplished before booster gear drive is eliminated, the one, by engagement, lifting the load off the other, to the end that there will be no period between booster gear drive and direct drive in which there is no drive, as there is in conventional gear shift mechanisms.

Another object is to provide a simple and effective reversing gear set separate from the other gear sets, with a manually operable lever to shift from the forward to a neutral position only when starting or limbering up the engine, and to a reverse position only when backing the vehicle, the lever being kept in the forward position at all other times and under all other driving conditions.

Another object is to so construct and arrange the ratio changing mechanism, that, altho acceleration may be effected by shifting from low thru second to high, it may, whenever desirable, be effected by shifting directly from low to high.

Another object is to so proportion and arrange the speed responsive devices which shift the transmission clutches that, altho they are designed to shift from one ratio to the next at certain fixed speeds, they will not do so as long as power is being transmitted thru the ratio which is then in effect, then provide a signalling device which becomes operative to show when a shift should preferably be made and again inoperative to show when it has been made.

Another object is to provide a manually operable lockout means whereby the fourth or overdrive ratio may be rendered wholly ineffective, so that, when driving in mountainous country, the highest ratio will be third speed or high, both for forward driving and for engine braking.

That the foregoing enumerated objects and other meritorious features are attained in the embodiment of the invention hereinafter illustrated and described will be apparent when the specification is read with reference to the drawings, wherein, Fig. 1 is a longitudinal axial section taken thru the transmission as at 1—1 of Fig. 2.

Fig. 2 is a transverse section, taken at 2—2 of Fig. 1, showing the construction of the main and auxiliary engine clutches and the booster gear set principally in elevation.

Fig. 3 is a half transverse section, taken at 3—3 of Fig. 1, showing the roller brake which is provided for holding the ring gear of the booster gear set from rotating backwardly.

Fig. 4 is a half transverse section, taken at 4—4 of Fig. 1, thru the hinge and work arm of one of the centrifugal weights which effect a shift in the transmission gear set from underdrive ratio to direct drive ratio.

Fig. 5 is a half transverse section, taken at 5—5 of Fig. 1, thru the body of one of the underdrive-to-direct centrifugal weights, and thru the jaw clutch which normally connects the planet pinion carrier of the transmission gear set to the transmission output member.

Fig. 6 is a half transverse section, taken at 6—6 of Fig. 1, showing the gearing of the transmission gear set.

Fig. 7 is a transverse section, taken at 7—7 of Fig. 1, thru the signalling device which is provided to show when any shift in transmission ratio is desirable and when it has been made, and thru the jaw clutch which is normally disconnected but is operable at a certain speed to connect the transmission input shaft to the planet pinion carrier of the transmission gear set to effect overdrive ratio.

Fig. 8 is a plan view of the main parts of the direct-to-overdrive jaw clutch, one of the parts of which appears in cross section in Fig. 7.

Fig. 9 is a fragmentary transverse section, taken at 9—9 of Fig. 1, thru the manually operable mechanism which sets the transmission for forward, neutral or reverse.

Fig. 10 is a part transverse section taken at 10—10 of Fig. 1, thru the hinge and work arm of one of the centrifugal weights which effect a shift in the transmission gear set from direct drive ratio to overdrive ratio.

Fig. 11 is a transverse section, taken at 11—11 of Fig. 1, thru the shifting fork of the lockout mechanism which eliminates the overdrive, and thru the detent mechanism which holds the lockout and the forward, neutral and reverse mechanism in the selected position.

Fig. 12 is a transverse section taken at 12—12 of Fig. 1, thru the forward, neutral and reverse shifting fork.

Fig. 13 is a half transverse section thru the reversing gear set and thru the shifting mechanism which operates the overdrive lockout.

Fig. 14 is a transverse section thru the speedometer gearing.

Fig. 15 is a diagram showing the action of the centrifugal weights of the auxiliary engine clutch as the weights swing outwardly about their hinge pins to different angular positions, the diagram giving the total deflections of the clutch engaging springs at each unit of angular movement of the weights, the stress of the springs in each weight position and the R. P. M. required of the weights to produce in the springs the given clutch engaging stresses thru the leverages available.

Fig. 16 is a curve chart, plotted from the values in Fig. 15, showing the available engine power at any speed, and what portion of the power available at any given speed may be applied at that speed without bringing the speed-torque controlled booster gear into action, the booster gear coming into action with progressively less power application as the engine speed is lower and the torque output less. It also shows, by comparison, the difference in result obtainable when centrifugal force is applied thru a progressively less effective leverage as compared with direct application.

Fig. 17 is a plan view of the main parts of the underdrive-to-direct jaw clutch, one of the parts of which appears in cross section in Fig. 5.

Fig. 18 is a wiring diagram showing the connections for the electrical signal which indicates when shifting of the clutches should occur.

*Construction*

The clutch housing 26 may be secured to the engine 28 by screws 27. A booster gear housing 29 is formed integral with the clutch housing by depressing the rear wall thereof. The transmission gear housing 30 is secured to the clutch housing by the screws 31. A partition 32 is interposed between the open ends of the booster gear housing 29 and the transmission gear housing 30. The reverse gear housing 33 is integral with the transmission housing 30, a partition wall 34 separating them. The rear bearing head 35 is held to the housing 33 by screws 36.

Secured to the crankshaft 37 by bolts 38 is the flywheel 39, the rim 40 of which has internal splines 42 to which the external splines of the main clutch backing plate 43 and pressure plate 44 are slidably fitted. A spring ring 45 in a groove in the rim 40 limits forward movement of the backing plate 43.

The main clutch frame 46 is secured to the flywheel rim 40 by screws 48 and carries a series of hinge ears 49 (see Fig. 2) to which the main clutch weights 50 are swingably held by hinge pins 52. Pressure plate 44 has a series of pins 53 which extend thru holes in the frame 46, the ends of the pins touching the upper front face of the weights.

A second series of pins 54 carried by the pressure plate 44 have their rear ends bearing against the lower front face of the weights. Midway between adjacent weights 50 are a series of hubs 55. Pressure plate 44 has a series of studs 56 extending thru the frame 46 and fitting it closely but slidably.

The hubs 55 are counterbored to receive the springs 58. Collars 59 held on the free end of the studs 56 by nuts 60 fit the counterbored part of the hub closely but slidably and hold the springs 58 under an initial tension. The close fitting studs 56 and collars 59 serve as guides to restrain one side of the pressure plate 44 moving ahead of the other and consequently cause the weights 50 to move out in unison.

The clutch plate 62 is faced with a commercial dry clutch facing 63. The inner diameter of the plate is flanged at 64 and carries the studs 65 and rollers 66 thru which the plate transmits its power when clamped between the backing plate 43 and pressure plate 44. The main clutch may be broadly designated by the numeral 70.

The transmission input shaft 68 has external splines 69 over which the internally splined hub 72 of the auxiliary clutch frame 73 is fitted.

The clutch frame 73 is provided with pairs of hinge ears 74 between which the weights 75 of the auxiliary clutch (see Fig. 2) are swingably supported by the hinge pins 76. Each weight has a pair of hubs 78 on a reduced outer end of each of which a roller 79 is rotatable. The rollers are held in place by washers 80 which are held on the reduced end by riveting. The ears 74 are so shaped on their outer edges as to provide a stop for the hubs 78 to limit inward swinging of the weights.

The auxiliary clutch pressure plate 82 has a hub 83 slidable axially over the hub 72 of the clutch frame. A light spring 51 always urges plates 73 and 82 axially apart. A series of guide studs 84 are held angularly spaced in the pressure plate 82 by the nuts 85. The studs 84 may be hollowed for lightness.

A spring compressing plate 86 has a series of hubs 88 extending forwardly intermediate the ears 74, and a series of arms 89 extending outwardly from the hubs, each arm 89 lying immediately in back of and in contact with a roller 79.

The hubs 88 are bored at their outer ends to fit over the guide studs 84 closely but slidably, then counterbored to receive the springs 92, the enlarged outer ends 93 of the studs 84 being slidably fitted to the counterbores. The clutch plate 94 is faced with linings 95 similar to the main clutch plate 62 and has external teeth 96 which fit slidably into the internal splines 98 of the flywheel rim 40. The auxiliary clutch may be broadly designated by the numeral 100.

The booster gear set which is contained in the housing 29 and enclosed therein by the partition 32, comprises a planet pinion carrier 99, the hub 102 of which is internally splined to fit over the external splines 97 of the shaft 68. The carrier 99 has a series of angularly spaced studs 104 each of which has rotatable thereon a planet pinion 105 provided with a bearing bushing 106. A washer 101 and rivet 103 holds each pinion from axial movement.

A sun gear 108 and the inner member 110 of a roller brake are end splined together at 121, both being press fitted over the same bearing bushing 109 which is rotatable on the outside of the hub 102. The outer ring 113 is concentrically held to the partition plate 32 by screws 90. Rollers 112 cooperate with the inner member 110 and outer ring 113 to hold the sun gear from rotating backwardly, the usual springs 111 and plungers 117 being provided to urge the rollers toward operative position. By backwardly is meant anti-clockwise when viewed from the left of Fig. 1. The sun gear 108 is in constant mesh with the planet pinions 105. The roller brake may be broadly designated by the numeral 107 (see Fig. 3).

The ring gear 114, also in mesh with the planet pinions 105, has a forwardly extending hub 115 which has press fitted therein a bearing bushing 116 which is freely rotatable on the transmission input shaft 68. A ring gear driving member 118 has a rearwardly extending hub 119 which is slidably fitted over the bearing bushing 116.

The hubs 115 and 119 are end splined together at 120 and a spring ring 127, snapped into a groove in the outside of the bushing, holds the hub 119 on the bushing. The rear end of the bushing is enlarged to slidably fit into a counterbored opening 91 in the hub 102. A small hole 87 connects the counterbore 91 to the hollow interior of the shaft 68, whereby the enlarged end of the bushing may have a dash pot action in moving axially in the counterbore 91, its rate of movement being limited by the flow of oil thru the small hole 87, thereby preventing a too rapid engagement or disengagement of the clutch 100.

An annular groove 81 collects oil escaping forwardly between shaft 68 and bushing 116 and returns it to housing 29 thru small hole 77. An oil throw rib 71 on shaft 68 assists in throwing off the leakage oil. A second annular oil collecting groove 67 further forward in bushing 116 has holes 61 which connect to notches 57 to slightly lubricate the thrust bearing 132.

The booster gear housing 29 has a forwardly extending hub 122 provided with a bearing bushing 123 in which the hubs 115 and 119 are runningly fitted. The forward end of the hub 122 is enlarged to contain the annular groove 124 which catches any oil escaping from the end of the bushing 123 and returns it thru the hole 125. An oil throw 128, formed on the ring gear driving member 118 assists in confining the leakage oil to the groove 124. A second annular groove 129 is formed in the ring gear driving member 118, this second groove being provided to collect any oil which may escape past grooves 81 and 67 and thrust bearing 132. Small holes 130 are provided to transfer any oil collected in groove 129 to the groove 124.

The end thrust bearing 132 is preferably made of graphite impregnated bearing metal such as is now commercially available for clutch thrust bearings. The thrust bearing 132 is brought to a sharp outer edge at 133 to assist it in throwing any drops of oil which may reach it, into the groove 129.

A circular row of shouldered pins 134 are secured in the ring 132 and are freely slidable thru holes in the auxiliary clutch frame 73, their ends normally bearing against the end of the hub 83 of the auxiliary clutch pressure plate.

The ring gear driving member 118 has a rim 135 the outside of which is provided at suitably spaced intervals with slots 136 which extend entirely thru the rim. Slots 136 fit over the rollers 66 closely but runningly, whereby the driving member 118 may shift axially with respect to the clutch plate 62 while under load.

A shoulder 138 on the splines 97 secures the carrier 99 against axial movement on the shaft 68. A small bronze washer 139 takes any slight rearward end thrust which the carrier may have, the carrier being, of course, balanced against axial movement between the axially rearward thrust on the sun gear and the axially forward thrust on the ring gear. The sun gear needs no thrust washer inasmuch as it never rotates while under load.

A bronze washer 140 limits forward movement of the ring gear to the position shown, its rearward movement being arrested when the space 141 is taken up. A thrust washer 142 as well as the bearing bushing 143 which rotatably supports the forward end of the shaft 68 may preferably be made of graphite impregnated bearing metal.

The rear end of the shaft 68 is rotatable in a bearing bushing 144 press fitted into the hub of the transmission output member 145.

Midway the partitions 32 and 34 in the housing 30 is the transmission gear set which provides an underdrive, a direct, and an overdrive ratio. The sun gear 146 has a long bearing bushing 148 press fitted therein, the transmission input shaft 68 being runningly fitted in this bushing. A hub 152 extends rearwardly from the partition plate 32 and a bushing 154 is press fitted into this hub. The sun gear 146 and the hub 152 of the partition member are end splined together at 156 whereby the sun gear is positively held against rotation at all times.

The planet pinion carrier of the transmission gear set comprises a front bearing member 158 provided with a bearing bushing 160, and a rear bearing member 162 provided with a bearing bushing 164. Planet pinion bearing hubs 166 hold the carrier bearing members axially spaced apart, and the bolts 168 and nuts 170 extending thru the carrier bearing members and the pinion bearing hubs hold the carrier parts together.

Planet pinions 172 having bearing bushings 174 are rotatable on the bearing hubs 166, the pinions being in constant mesh with the sun gear 146.

The ring gear 176 is in constant mesh with the planet pinions 172. Its front bearing member 178 and its rear bearing member 180 are secured to the ring gear by bolts 182 and nuts 184. The front bearing member 178 is provided with a bearing bushing 186 and the rear bearing member 180 with a bearing bushing 188.

These bearing bushings enable the ring gear to rotate in concentric relation with the sun gear, but carry no radial load except the weight of the several parts.

The output member 145 of the transmission gear set has a rearwardly extending hub 190 rotatable in the ball bearing 192, held in the partition 34, the front end being closed by the bearing head 194 secured in place by the screws 196. The bearing head 194 is provided with a bearing bushing 198. End thrust washers 195, 197, 199, 201 and 203 limit axial movement of the several parts.

For convenience in further description, the ring gear 176, its bearing heads 178 and 180, its bolts 182, and nuts 184 and its bearing bushings 186 and 188 may be collectively referred to as the ring gear element. For the same reason, the planet pinion carrier front bearing member 158 and rear bearing member 162 with their bearing bushings 160 and 164, and the planet pinion bearing hubs 166 with their bolts 168 and nuts 170 may be collectively referred to as the carrier element.

Obviously, with the sun gear 146 permanently held from rotating by the end splines 156 as hereinbefore described, if the ring gear element is rotated, the carrier element will rotate in the same direction but at less speed, and if the carrier element is rotated, the ring gear element will rotate in the same direction but at greater speed. The ring gear element will under all conditions, rotate faster than the carrier element.

It follows that, if the input member of the transmission gear set is connected to the ring gear element, and the output member to the carrier element, an underdrive ratio will be provided wherein the output member will rotate more slowly than the input member.

Conversely, if the input member is connected to the carrier element, and the output member to the ring gear element, an overdrive ratio will be provided wherein the output member will rotate faster than the input member.

On the other hand, if both the input member and the output member are connected at the same time to the same element, a direct drive will be provided wherein the input member and output member revolve at the same speed. Both members in this case may preferably be connected to the ring gear element for then the carrier element merely rotates idly at sub engine speed as does the countershaft of a conventional synchromesh transmission during direct drive.

Of course, a direct drive may be had by connecting the input member and the output member both at the same time to the carrier element, but in that case the ring gear element will rotate idly at super engine speed, which is less desirable.

It will now be apparent that, with the single planetary gear train, arranged as shown, an underdrive ratio, a direct drive ratio, and an overdrive ratio may be had by providing the input and output members each with a clutch which will, each at its own proper time, take hold of one of the rotating elements, i. e., ring gear element or carrier element, and let go of the other.

Accordingly two clutches are provided. The clutch which is carried on the output member has one jaw member which normally engages jaws on the carrier element, and a second normally idle jaw member which may become operative above a predetermined speed to first engage jaws on the ring gear element, then cause the first jaw member to release the jaws on the carrier element.

The clutch which is carried on the input member has one jaw member which normally engages jaws on the ring gear element, and a second normally idle jaw member which may become operative above a higher predetermined speed, to first engage jaws on the carrier element, then cause the first jaw member to release the jaws on the ring gear element.

The clutch which is carried by the output member, and which functions to shift from an underdrive ratio to a direct drive ratio may be for greater convenience in further description called the direct drive clutch. The other clutch which is carred by the input member, and which functions to shift from a direct drive ratio to an overdrive ratio, may for a like reason be called the overdrive clutch.

The direct drive clutch is carried in the output member bearing head 194 which has internal splines 208. Jaw members 210 and 212 have external splines which are axially slidable in the splines 208. Jaw members 210 and 212 are exactly alike except that one is turned end for end with respect to the other. They are given different numerals only to facilitate subsequent description of their operation.

On the outside of the head 194, eight weights 214 are equally spaced and hinged between ears 216 by hinge pins 218, the work arms 220 of the weights extending thru slots 222 in the head. The outward movement of the weights is accurately limited by contact of the work arms 220 with the rear edges of the slots.

The inner ends of the work arms 220 extend into an annular groove in the shift collar 224 which also has external splines slidably fitted to the internal splines 208. A weight return spring washer 226 has external splines also slidable in the internal splines 208, and a weight return spring 228 under considerable stress urges the washer 226 forwardly.

In the instant embodiment there are twelve equally spaced internal splines 208 and on the collar 224 and washer 226 there are twelve external splines slidable in the internal splines. On the jaw members 210 and 212, however, every fourth external spline is cut away (see Fig. 5) which leaves three spaces between internal splines 208 into which loose fitting keys or props 230 are placed. These props should be fitted loosely enough that they will slide freely endwise even when the remaining external splines on the jaw members are transmitting torque, and should preferably have a length which will so prop the collar 224 and washer 226 apart that the spaces 232 and 234 when added together will equal the maximum total travel of the shift collar 224.

An extension 236 of the carrier front member 158 is end splined thereto at 240, the forward end of the extension having outwardly extending jaws 242 which normally align with and fit between corresponding internal jaws 244 in jaw member 210.

A bearing bushing 246 is press fitted into the extension and rotatable on hub 152. End jaws 248 on the outer end of the ring gear front bearing member 178 are adapted to mesh with corresponding internal jaws 250 on the inside of jaw member 212 when the clutch shifts to direct drive.

A shift ring 252 fits freely in the inside of jaw member 210 and has three legs 254 freely slidable in notches formed in the inside of the jaw member. The legs 254 are just long enough to touch the shift collar 224 when the ring 252 is pressed against the internal jaws 244 of the member 210.

A second shift ring 256 fits freely in the inside of jaw member 212 and has three legs 258 freely slidable in notches formed in the inside of the jaw member. The legs 258 are just long enough to touch the spring washer 226 when the ring 256 is pressed against the internal jaws of the member 212. A shift spring 260 holds the rings 252 and 256 spread apart as shown, altho either ring may be moved toward the other by pressure against the outer ends of the legs 254 or 258 without moving the jaw members 210 or 212.

A ratchet spring 262 is so placed as to constantly urge the jaw members 210 and 212 axially apart, and, in order to limit their relative axial displacement, a means shown more or less diagrammatically in Fig. 17 is employed. This means consists of hooks 264 formed integral with the bodies of the jaw members which allow them to move closer together to take up the spaces 266 and 268, but not spread farther apart.

One pair of hooks only is shown for illustration but it will be apparent that several such pairs of hooks may be circumferentially spaced around the jaw members.

The jaws 244 and 250 are beveled on their outer faces as at 270 and 272, while the jaws 242 and 248 are beveled on their inner faces as at 274 and 276, (see Fig. 17). The amount of this bevel should preferably be equal to one-fourth the face width of the jaw. The view Fig. 17 is taken looking in the direction of the arrow 278, Fig. 5.

The overdrive clutch is carried on the transmission input shaft 68 which has external splines 280. Jaw members 282 and 284 have internal splines which are axially slidable on the splines 280. Jaw members 282 and 284 are exactly alike except that one is turned end for end with respect to the other. They are given different numerals only to facilitate subsequent description of their operation.

On the outside of the transmission output member 145, four weights 286 are equally spaced and hinged between ears 288 by hinge pins 290, the work arms 292 of the weights extending thru slots 294 in the output member. The outward movement of the weights is accurately limited by contact of the work arms 292 with the front edges of the slots. The inner ends of the work arms 292 extend into an annular groove in a shift collar 296 which is freely rotatable on a small forwardly extending hub of the output member 145. A shift washer 298 has internal splines which slidably fit the external splines 280 of the shaft.

A weight return spring washer 300 has internal splines also slidable in the external splines 280, and a weight return spring 302 under considerable stress urges the washer 300 rearwardly.

In the instant embodiment there are nine equally spaced external splines 280, and on the shift washer 298 and weight return spring washer 300 there are nine internal splines slidable on the external splines. In the jaw members 282 and 284, however, every third internal spline is cut away (see Fig. 7) which leaves three spaces between external splines 280 into which loose fitting keys or props 304 are placed. These props should be fitted loosely enough that they will slide freely endwise even when the remaining internal splines in the jaw members are transmitting torque, and should preferably have a length which will so prop the washers 298 and 300 apart that the spaces 306 and 308 when added together will equal the maximum total travel of the shaft collar 296.

The rearwardly extending end of the ring gear rear bearing member 180 has inwardly extending jaws 310 which normally align with and fit between corresponding external jaws 312 on the jaw member 282. End jaws 314 on the outer end of the carrier rear bearing member 162 are adapted to mesh with corresponding external jaws 316 on the outside of jaw member 284 when the clutch shifts to overdrive.

A shift ring 318 fits freely over the outside of jaw member 282 and has three legs 320 freely slidable in notches formed in the outside of the jaw member.

The legs 320 are just long enough to touch the shift washer 298 when the ring 318 is pressed against the external jaws 312 of the jaw member 282. A second shift ring 322 fits freely over the outside of jaw member 284 and has three legs 324 freely slidable in notches formed in the outside of the jaw member. The legs 324 are just long enough to touch the spring washer 300 when the ring 322 is pressed against the external jaws 316 of the member 284. A shift spring 326 holds the rings 318 and 322 spaced apart as shown, altho either ring may be moved toward the other by pressure against the outer ends of the legs 320 or 324 without moving the jaw members 282 or 284.

A ratchet spring 328 is so placed as to constantly urge the jaw members 282 and 284 axially apart, and in order to limit their relative axial displacement, a means shown more or less diagrammatically in Fig. 8 is employed. This means consists of the hooks 330 formed integral with the bodies of the jaw members which allow them to move closer together to take up the spaces 332 and 334 but not spread farther apart. One pair of hooks only is shown, but it will be apparent that several such pairs of hooks may be circumferentially spaced around the jaw member.

The jaws 312 and 316 are beveled on their outer faces as at 336 and 338, while the jaws 310 and 314 are beveled on their inner faces as at 340 and 342 (see Fig. 8). The view Fig. 8 is taken looking in the direction of the arrow 344, Fig. 7.

Surrounding the transmission output member 145 is an insulating ring 346 around which is a metal ring 348. The metal ring 348 has a laterally projecting strip 349 which carries a metal contact stud 350 and an upwardly extending strip 352 thru which a long screw 354 extends to carry electric current to a contact lug 356. The lug 356 is imbedded in the insulating block 358 which is held to the head 194 by a screw 360. The contact stud 350 is supported in an insulating clamp 362 held to the output member 145 by the screw 364. Other insulating clamps 365 are circumferentially spaced apart to provide additional support for the rings 346 and 348. An insulating tube 366 and washer 368 electrically separate the screw 354 from contact with parts 194 and 145.

One only of the weights 214 carries a plunger 370 backed up by a spring 372 which normally keeps the plunger in contact with the block 358 as shown. One only of the weights 286 carries a plunger 374 backed up by a spring 376 which normally keeps the plunger in contact with the insulating clamp 362. When the weights 214 and 286 swing on their hinges exactly one-half of their total outward swinging movement, the plungers 370 and 374 will be aligned with the lug 356 and stud 350 respectively. A collar 377 is fitted to the outside of the ears 288 and is slidable axially forward from the position shown over the overdrive weights 286 to hold them from moving outward under certain circumstances, the purpose of which will hereinafter be more fully described. Collar 377 is externally grooved to receive the shifting fork 379.

A flanged brush holder 378 and its cover 380 of insulation are held to the housing 30 by screws 382, and carry a brush 384 which is held in electrical contact with the ring 348 by a spring 386 which abuts against the head of a binding screw 388 having binding nuts 390 and washers 392. A flexible lead 394 electrically connects the binding screw to the brush. A resistance 379 and wire 381 may conduct current from the post 388, to a battery 383, thru a small lamp 385, or other signalling means to indicate when either the plunger 370 or 374 has contacted the lug 356 or stud 350 to complete a circuit to the ground.

A small bi-metallic thermostat 387 may be connected in parallel with the resistance 379 by wires 391 and 393 whereby expansion from heat will cause the contact 395 to engage the adjustable grounded screw 397.

The long hub 190 of the transmission output member 145 extends rearwardly into the reversing gear compartment. The reversing sun gear 396 has internal splines 398 which fit external splines on the hub.

The tail shaft 400 is rotatably supported near the rear end by the ball bearing 402 held against axial movement in the bearing head 35 by the snap rings 404 and at the front end by the bearing bushing 406 which is press fitted into the rear end of the hub. The larger diameter of the tail shaft 400 abuts the rear end of the sun gear 396 and thereby prevents the sun gear from moving axially.

The rear end of the tail shaft is threaded for the nut 408 which holds the speedometer driving gear 410, the ball bearing 402 and the universal joint member 412, which has internal splines 414 fitted over the external splines on the tail shaft.

A cup 416 held in the bearing head 35 contains packing 418 which fits the universal joint member closely. A speedometer driven shaft 420 with integral gear 422 is rotatable in the bearing member 424. The ring gear 426 is shown integral with the tail shaft 400 but may be separately made and permanently secured thereto.

The reversing planet pinion carrier front bearing member 428 is provided interiorly with the bearing bushing 430 within which the hub of the sun gear 396 may rotate. Integral hollow hubs 432 extend toward each other to rotatably support the planet pinions 434 in constant mesh with both the sun gear and the ring gear. The pinions 434 are provided with bearing bushings 436 which are rotatable on the hubs 432. The carrier rear bearing member 438 is held to the front member 428 by the bolts 440 and nuts 442. A bearing bushing 444 in member 438 is rotatable on the tail shaft.

At the forward end, the carrier member 428 has external teeth 446 adapted to fit slidably into the internal teeth of the plate 448 which is held to the partition 34 by rivets 450. Member 428 also has internal teeth 452 adapted to fit slidably over the teeth of the sun gear 396. Near the forward end, the member 428 is grooved to receive the shifting fork 454.

The mechanism for operating the shifting forks 379 and 454 is carried on the cover member 456 held to the underside of the transmission housing by screws 458. Parallel guideways are formed in the cover member for the shifting slides 460 and 462 which carry the shifting forks 379 and 454 respectively.

Pockets 464 and 466 are formed in the cover 456 directly under the slides 460 and 462 respectively. In the section Fig. 1, the plane of the section is so deflected as to pass thru the front slide where the section 9—9 is taken and thru the rear slide where the section 13—13 is taken.

Pocket 466 contains a shaft arm 468, the upper end of which extends into a notch in the edge of the slide 462, while the lower end has an internally splined hub which fits over the external splines 470 of a rock shaft 472.

Pocket 464 contains a shift arm 474, the upper end of which extends into a notch in the edge of the slide 460, while the lower end has an internally splined hub which fits over the external splines 476 of a rock shaft 478.

A forward, neutral and reverse lever 480 is tightly secured to the outer end of the rock shaft 472 while an overdrive lockout lever 482 is tightly secured to the outer end of the rock shaft 478. Both rock shafts are provided with conventional packing means comprising an integral collar 484, two bevel faced collars 486, packing 488, a spring 490 and a threaded end cap 492 all as in common practice.

A detent means for each slide (see Fig. 11) comprises a ball 494 and spring 496 in a cup 498. A series of depressions 500 in the bottoms of the slides locate the slides in their several positions.

The entire transmission is lubricated by tapping the main oiling system of the engine, whereby no separate oil pump or reservoir is required. The oil is forced out thru the rear end of the crank shaft 37 into the hollow interior of the shafts 68 and 400, from which it is distributed to various points requiring lubrication thru radial holes (not shown).

Centrifugal force is depended upon to carry the oil from the interior of the shafts to the bearings, gears, etc., and the oil is preferably not maintained under pressure. To insure this condition, the holes 502 and 504 are provided and so located that one is always open.

The large opening in the center of shaft 68 is restricted at the front end by a press fitted bushing 506 whereby some oil is always trapped and retained in the shaft and is therefore available for starting until a new supply comes thru from the engine pump.

Since this oil is not delivered under pressure, a packing washer 508 effectively prevents leakage of oil between shaft 68 and bushing 143. Holes 510 transfer any slight amount of leakage oil to the outside of the clutch housing. A tapped oil return hole 512 in the bottom of the housing 30 may transfer the accumulated oil to a filter (not shown) and thence back to the oil reservoir of the engine.

*Proportion*

While this transmission may be proportioned for use with an engine of any horsepower and with vehicle weights within common practice, some suggestion as to proportion of the various parts and the procedure in determining the same for a given case may preferably be given.

If the diameter of the clutch housing 26 at section 2—2 is taken as 13⅝" and all parts made to the same scale, the transmission will be suitable for an engine of 110 H. P. at 3600 R. P. M. in a vehicle weighing approximately 3500 lbs.

For the reverse gear set within housing 33 where quiet operation and long wear are not the prime considerations, straight nonhelical gear teeth are chosen. The gearing selected is 13⅓—14 short tooth, 20 degree pressure angle. The ring gear 426 has 60 teeth on a pitch diameter of 4.500", the sun gear 396 has 30 teeth on a pitch diameter of 2.250" and the planet pinions 434 have 15 teeth on a pitch diameter of 1.125". The sun gear being the driver, the ring gear the driven, and the carrier nonrotative the ration is therefore $$\frac{R}{S}=\frac{60}{30}=2$$

input revolutions forward to 1 output revolution backward.

The gearing of the transmission gear set in the housing 30 is 14 pitch 14 degree pressure angle, 14 degree helix angle. The ring gear "hand" should correspond to the threads in a right hand nut. The ring gear 176 has 57 teeth on a pitch diameter of 4.196", the sun gear 146 has 27 teeth on a pitch diameter of 1.988" and the planet pinions 172 have 15 teeth on a pitch diameter of 1.104".

The ratio through the transmission gear set only, at low speed and before either transmission clutch has operated is therefore $$\frac{R+S}{R} = \frac{57+27}{57} = 1.474$$

input revolutions to 1 output revolution, the ratio after the direct drive transmission clutch has operated will, of course, be 1 input revolution to 1 output revolution, and the ratio after the overdrive transmission clutch has operated will be $$\frac{R}{R+S} = \frac{57}{57+27} = .6786$$

input revolutions to 1 output revolution.

To provide a well graduated range of speed ratios a booster gear set is now selected which will have a ratio of 1.6 to 1. This ratio may be had with a ring gear having 60 teeth, a sun gear having 36 teeth, and planet pinions having 12 teeth the ratio being $$\frac{R+S}{R} = \frac{60+36}{60} = 1.6 \text{ to } 1$$

Since the helix angle and the pitch diameters of the booster gears depend on certain factors having to do with the auxiliary dry plate clutch, the proportion of which is not yet, at this time, determined, these tooth angles and dimensions will be determined later.

However, since the ratio of the booster gear set has been selected as 1.6 to 1, by now selecting the rear axle ratio, the overall engine-to-wheel ratios may be determined. With the engine power and vehicle weight hereinbefore selected and a transmission having an overdrive, it is average present practice to use a 4.82 to 1 axle and 29″ wheels.

The booster gear set in itself operates either as an underdrive or a direct drive, while the transmission gear set may be coupled for underdrive, direct, or overdrive. Therefore the overall engine-to-wheel ratios will be the booster gear ratio × the transmission gear ratio × the axle ratio. With these ratios determined the forward engine-to-wheel ratios are as follows:

Ratios = booster × transmission × axle = engine-to-wheel
```
 1  =  1.6  ×  1.474   ×4.82=11.40=low
 2  =  1.6  ×  1.000   ×4.82= 7.72=torque second
 3  =  1.0  ×  1.474   ×4.82= 7.12=speed second
 4  =  1.6  ×   .6786  ×4.82= 5.24=torque high
 5  =  1.0  ×  1.000   ×4.82= 4.82=speed high
 6  =  1.0  ×   .6786  ×4.82= 3.27=overdrive
```

The two reverse ratios will be as follows:

Ratios = booster × transmission × reverse × axle = engine-to-wheel
```
 1  =  1.0  ×  1.474   ×  2.0  ×4.82=14.24
 2  =  1.6  ×  1.474   ×  2.0  ×4.82=22.80
```

Since it is the object in the booster gear set to use the thrust of the helical teeth of the booster ring gear 114 when under load as a torque responsive means to oppose and overcome the force of the engaging springs 92 of the auxiliary clutch 100, neither the helix angle nor the pitch diameter of the ring gear 114 may be determined without reference to the size and capacity of the dry plate clutch 100 to carry torque without slippage.

The helix angle and pitch diameter of the booster ring gear determine its thrust at the maximum H. P. point of the engine, i. e. 3600 R. P. M. and this thrust must be exactly equalled by an opposite force generated by the centrifugal weights 75 and stored in springs 92 at 3600 engine R. P. M. which transmitted through the 1.6 to 1 booster gear is 2250 weight R. P. M.

It has been found expedient to first determine the dimensions of the dry plate clutch 100 using as large a plate 94 as may be contained in the space available, whereby less clutch engaging pressure is required and therefore a less steep helix angle is required on the booster ring gear 114 to balance said pressure.

In the present embodiment a 11⅜″ O. D.×7⅓ I. D. double faced plate may be used. From present data available on carrying capacity of dry plates, such a disc, in order to just carry the maximum engine torque of 186 ft. lbs. without slippage must be clamped between the two metal plates 72 and 83 with a pressure of 498 lbs. The centrifugal weight 75 and springs 92 which effect this clamping will be so proportioned that when the weights fall in speed to 2250 R. P. M. the clutch 100 will be just at the point of failure to any longer carry 186 ft. lbs.

Having determined the size of the dry plate 94 of clutch 100 and the axial pressure required on it to enable it to just carry 186 ft. lbs. torque, the helix angle of the booster ring gear 114, which is to oppose the spring pressure tending to engage the clutch, and the pitch diameter and loading of the gear may be found.

To obtain the proper overlap of 20% to 25% between shift up and shift down of the booster mechanism, the axial thrust of the ring gear 114 should now be tentatively selected at from 30% to 35%, say 32% over the minimum clutch engaging pressure of 498 lbs. above found. The thrust would therefore be 1.32×498=658 lbs. This should be the axial thrust of the ring gear when it is being driven 3600 R. P. M. with the engine at its maximum torque for that speed which is 160 ft. lbs.

Thus a helix angle for the ring gear 114 is to be selected which will provide a 32% greater end thrust when the engine is rotating 3600 R. P. M. and delivering its then maximum torque of 160 ft. lbs. (see Fig. 16) than the clutch weights need apply to the dry plate to just carry the maximum torque of 186 ft. lbs.

With a maximum torque of 160 ft. lbs. at 3600 R. P. M. the pitch line load L on the ring gear 114 at 3600 R. P. M. is $$L = 160 \times \frac{12''}{\text{ring gear pitch radius}}$$

and in order to provide 658 lbs. end thrust, the pitch line load must be $$L = \frac{658}{\tan. \text{ helix angle}}$$

Therefore $$\frac{160 \times 12}{\text{ring gear pitch radius}} = \frac{658}{\tan. \text{ helix angle}}$$

whereby ring gear pitch radius=2.917 tan. helix angle.

The ring gear must therefore have a pitch radius which is 2.917× the tan. of the helix angle of its teeth.

The ring gear has 60 teeth and with 6 planets to divide the load a 16 pitch tooth will suffice. The pitch diameter therefore for non helical teeth will be $$\frac{60}{16} = 3.750''$$

With helical teeth the pitch diameter is 3.750×secant of the helix angle. The pitch radius is therefore 1.875×secant of the helix angle.
There are now two equations as follows: Pitch radius=2.917 tan. $A$, pitch radius=1.875 sec. $A$, where $A$=helix angle, therefore 2.917 tan $A$=1.875 sec. $A$, or tan $A$=.64279 sec. $A$, but since $$\tan = \frac{\text{sine}}{\cos.}$$

and $$\sec = \frac{1}{\cos.}$$

then by substituting $$\frac{\text{sine } A}{\cos. A} = \frac{.64279}{\cos. A}$$

and by cancelling sine $A$=.64279 whereby $A$=40°.

The helix angle of the ring gear is therefore 40°.

When starting with a dry plate of a given size and working out the ring gear helix angle as above, the helix angle will not always be an even number of degrees, but by taking the nearest even number of degrees to the angle arrived at, and working backwardly through the equations to the plate, the plate may be slightly modified to correspond to the even degrees selected.

With the helix angle of the booster gear set fixed at 40°, and the pitch and number of teeth known, the remaining dimensions of the gearing will be as follows: The ring gear has $$60 \text{ teeth } 16 \text{ pitch} = \frac{60}{16}$$

pitch diameter for nonhelical teeth and $$\frac{60}{16} \times \sec 40°$$

for the helical teeth selected. The pitch diameter of the ring gear is therefore $$\frac{60}{16} \times 1.3054 = 4.895''$$

the sun gear $$\frac{36}{16} \times 1.3054 = 2.937''$$

and the planet pinions $$\frac{12}{16} \times 1.3054 = .979''$$

The axial thrust of the ring gear above determined as 658 lbs., will be augmented by the force of 5 lbs. supplied by the light spring 51. At 3600 R. P. M. of the engine, the maximum possible axial force tending to keep the clutch 100 from engaging will be 658+5=663 lbs. The springs 92 and weights 75 must be so proportioned that, at 3600 engine R. P. M., the weights will have stressed the springs an amount equal to 663 lbs., and the springs will be applying this 663 lbs. to overcome the gear thrust of 663 lbs. and thereby engage the clutch. The weights will be revolving 2250 R. P. M. at this time.

The diagram Fig. 15 shows the action of the weights 75 under centrifugal force, the amount of axial movement of the plate 86, the resulting deflection of the springs 92, the stress of the springs caused by that deflection, and the R. P. M. at which the weights must revolve to produce that stress.

In Fig. 15, $o$ represents the center of the hinge pin 76; $a$ represents the center of gravity of a weight 75, as well as the center of a roller 79, when the weight is at its home position; $h$ represents the center of gravity of a weight when it is in the outermost position; $b$ to $g$ are intermediate positions to which the center of gravity may swing in the course of its outward swinging movement.

The distance $ao = ho = .770''$. The points $a$ to $h$ are spaced 10° apart; $a$ is at the 10° position; $h$ is at the 80° position; the vertical and horizontal distances $oa$, $ob$, etc. are the sines and cosines respectively of 10°, 20°, etc., × .770''. From the sines, the distances R from the axis of the transmission to the center of gravity of a weight in all positions $a$ to $h$ are found and tabulated. From the cosines, the amounts that the springs 92 are deflected by movement of the center of gravity from any point $a$ to $h$ are found and tabulated. The length of the springs, when the center of gravity is at $a$, is 1.375''.

Column 1, Fig. 15, shows the axial movement of spring plate 86 for the movements of weights 75 traveling from $a$ to $h$; column 2 the deflection of springs with weights in their several positions when the clutch 100 is engaged; and column 3, the deflection of the springs with weights at $a$ to $h$ when the booster gear is operative. The reason that the two columns have different spring deflections is that, in order to close up the clutch, the spring plate 86 moves .0915'' without changing the spring length. Therefore when the gear is operative as shown in Fig. 1, the outward swinging of a weight 75 immediately starts to shorten the springs 92, but when the clutch is engaged, the weights must swing from $a$ to $c$ to take up the slack between the plates, which is .0915'', without changing the spring length.

These deflection values may not be gotten at this time but must await determination of the spring dimensions.

It has heretofore been determined that when the engine is revolving 3600 R. P. M. and the weights are therefore being driven through the booster gear at 2250 R. P. M., the weights should create a stress of 663 lbs. in the springs. It must now be determined to what position, $a$ to $h$, the weights shall have swung to be energizing the springs with a force of 663 lbs. The position $g$, which is the 70° position, is selected.

Knowing the springs to be 1.375'' long with weights at $a$, and finding from column 1 that they are shortened .495'' in moving to the 70° position if the gear is operative, the length in this position will be 1.375−.495=.880''. There are eight springs and their combined stress is to be 663 lbs. with weights at $g$, where the springs are .880'' long. Each spring will therefore be stressed ⅛ of 663 lbs.=82.875 lbs.

A spring of .135'' round wire, coiled ⅞'' pitch diameter, with five coils and a free length of 1.515'' will be stressed to 82.875 lbs. when shortened to be .880'' long. Since the length of a spring in place with a weight at $a$, is 1.375'', the initial deflection is 1.515−1.375=.140''.

By adding the initial deflection .140'' to the values in column 1, the total deflection to be tabulated in column 3 may be determined. To determine the deflections in column 2, the slack .0915'' in the clutch is subtracted from each value in column 3. Thus the deflection in column 3, for the g position is 140″+.495″=.635″. The g deflection in column 2 is .635−.0915=.5435″. The remaining dimensions for column 2 are similarly found.

Since the stress of a spring is directly proportional to its deflection, and columns 2 and 3 show the deflections, and a spring in the g position will be stressed to 82.875 lbs. when deflected .635″, the stress of the remaining deflection values may be calculated by the equation S $$=\frac{D}{.635}\times 82.875''$$

or S=130.5 D, where S is the stress of one spring and D the deflection values of columns 2 and 3. For eight springs, therefore, S=1044D.

From the last equation the values for columns 4 and 5 are found from those in columns 2 and 3. Columns 4 and 5 will then show the stress of eight springs in the several positions a to h of the weights.

It is now required to so proportion the weights 75 that when they are in the g position and are rotating 2250 R. P. M. they will be producing an axial force of 663 lbs., so that the springs will be under this stress in this position and at this speed.

From Figs. 1 and 15 it will be seen that the farther out a weight swings, the less axial force results per pound of centrifugal force, the radial centrifugal force of the weights in any angular position a to h having a resultant axial component of $$\frac{\text{cosine}}{\text{sine}}$$

of the angle with the transmission axis $x$ the centrifugal force.

The eight weights, therefore, must be of such weight as will arrive at the 70° position g where their centers of gravity are 5.0676″ from the transmission axis, when they are rotating 2250 R. P. M., and must be then generating sufficient centrifugal force to produce a resultant axial force of 663 lbs. when the centrifugal force is being translated into axial force through a leverage of $$\frac{\cos 70°}{\sin 70°}=\frac{.34202}{.93969}$$

The well known formula for centrifugal force is, (1) $\qquad F=.0000284WRN^2$ wherein F is the centrifugal force in lbs., R is the radius in inches, and N is the R. P. M.

Having found F, the axial component F′ resulting after F has acted through the leverage of $$\frac{.34202}{.93969}$$

may be expressed in the equation (2) $\qquad F'=.0000103WRN^2$ which transposed becomes (3) $\qquad W=\frac{F'}{.0000103RN^2}$ wherein F′=663 lbs., R=5.0676″, N=2250 R. P. M. which makes N²=5,062,500.

Solving, W is found to be 2.500 lbs. for the eight weights. Their thickness may therefore be varied until the eight weights 75, with their hubs 78, rollers 79 and washers 80, will weigh just 2.500 lbs.

Having found that eight weights totalling 2.500 lbs., rotating 2250 R. P. M., with centers of gravity swung to the 70° position which is 5.0676″ from the axis of the transmission, and acting through a leverage of $$\frac{.34202}{.93969}$$

will create an axial force of 663 lbs., and that the spring stress is also 663 lbs. at this position of the weights, it may now be found at what R. P. M. the weights must be rotating to reach each of the several positions a to h and generate forces equal to each of the several tabulated spring stresses when at the several tabulated distances R from the axis, and acting through the several leverages $$\frac{\text{cosine}}{\text{sine}}$$

of the angles of the several positions.

Repeating Equation 1, $F=.0000284WRN^2$ or $$N=\sqrt{\frac{F}{.0000284WR}}$$

or $$N=187.6\sqrt{\frac{F}{WR}}$$

F′=F after it has acted through a leverage of $$\frac{\cos A}{\sin A}$$

where A is the angle of any position a to h. So, (4) $\qquad F'=F\dfrac{\cos A}{\sin A}$ or $$F=F'\frac{\sin A}{\cos A}$$

or F=F′ tan A.

Rewriting Equation 1 substituting for F the value of F indicated in Equation 4 we have, (5) $\qquad N=187.6\sqrt{\dfrac{F'\tan A}{WR}}$ and since W=2.500 lbs., (6) $\qquad N=118.66\sqrt{\dfrac{F'\tan A}{R}}$ wherein A is the angle to which the weight has swung, F′=values in columns 4 and 5, Fig. 15, and R the distances from the transmission axis, Fig. 15.

Solving by Equation 6 for the 80° position, when the clutch is operative, $$N=118.66\sqrt{\frac{703.13\times 5.6713}{5.1023}}=3317 \text{ R. P. M.}$$

and when the gear is operative $$N=118.66\sqrt{\frac{798.66\times 5.6713}{5.1023}}=3535 \text{ R. P. M.}$$

The values of N are similarly found for all positions a to h and entered in Fig. 15 columns 6 and 7, from which the force curves t and s of the chart Fig. 16 are plotted. The curves u and y show the force of centrifugal weights of conventional design. The curve w is the maximum torque curve of the engine selected, and the curve v a torque curve less than maximum selected for illustration.

At the top of the chart Fig. 16 the R. P. M. of the weights 75 from 0 to 4200 is given, and the corresponding M. P. H. with the transmission gear set in underdrive, direct drive, and overdrive are tabulated. The two columns at the left show the engine torque values and the corresponding axial force which these values generate in the helical ring gear 114 to hold the clutch 100 disengaged.

The light spring 51 which acts in favor of the helical gear thrust is taken at 5 lbs. and is added to each value of gear thrust in column 2. This 5 lb. spring should be made of a round wire of $\frac{3}{32}$" diameter coiled 2½" pitch diameter, have 2 coils and a free length of 1.781". The two columns at the right show the force which the weights 75 may store in the springs 92 and the corresponding foot lbs. carrying capacity of the clutch 100. The chart will hereinafter be referred to in describing the operation of the transmission.

For the main engine clutch 70, the same size dry plate is used as for the auxiliary clutch 100. If the weights 59 are made to the scale proposed, and the springs 58 made of .080" round wire coiled ⅝" pitch, diameter, have 8 coils, and a free length of 1.840", the clutch will have developed a carrying capacity of about 18 ft. lbs. at 450 engine R. P. M. which gradually rises to 130 ft. lbs. at about 750 engine R. P. M. This makes for a gentle engagement.

The several parts of the direct drive clutch may be made to the scale selected, but in order to have the clutch shift up from underdrive to direct at 15 M. P. H. when the driving force is released, the springs 228, 260, 262, and 372 should be made to exact specifications.

The spring 228 should be made of .156" round wire, coiled $3\frac{3}{16}$" pitch diameter, have 2½ coils, and a free length of 4.82 inches. The spring 260 should be made of .093" round wire, coiled 2⅞" pitch diameter, have 3½ coils, and a free length of 5.45". The spring 262 should be made of .093" round wire, coiled 2½" pitch diameter, have 7 coils, and a free length of 3.1".

The spring 372 should be made of .020" round wire, coiled $\frac{3}{32}$" pitch diameter, have 10 coils and a free length of .770". With the above springs, the transmission shift from underdrive to direct may be made at 15 M. P. H. and the shift back down at 11.83 M. P. H.

The several parts of the overdrive clutch may be made to the scale selected, but in order to have the clutch shift up from direct to overdrive at 30 M. P. H. when the driving force is released, the springs 302, 326, 328, and 376 should be made to exact specifications.

The spring 302 should be made of .105" round wire, coiled $1\frac{1}{16}$" pitch diameter, have 5 coils and a free length of 6.4". The spring 326 should be made of .080" round wire, coiled 1¾" pitch diameter, have 6 coils and a free length of 4.17". The spring 328 should be made of .080" round wire, coiled 2⅛" pitch diameter, have 12 coils and a free length of 5.38". The spring 376 is made exactly like spring 372. With the above springs, the transmission shift from direct to overdrive will occur at 30 M. P. H. and the shift back down at 23 M. P. H.

Operation

The normal condition of the mechanism, i. e., the condition which exists when the engine is at rest or is idling below 400 R. P. M. is that which is shown in the drawings, where the centrifugal weights of the main clutch 70, the auxiliary clutch 100, and the transmission clutches 204 and 206 are all in their "clear in" positions and the reversing gear set is in neutral. In this condition the engine may be run and warmed if desired.

As the engine speed rises, the clutch 70 first engages and operates the booster gear, which in turn rotates the shaft 68 which in turn operates the clutch 100. The weights of the transmission clutches also operate in and out at certain points in the rise and fall of the speeds. This limbers up not only the engine but the entire transmission mechanism. No power is transmitted because the reversing gear is in neutral.

To set the reversing gear set for moving the vehicle backwardly, the lever 480 is drawn forwardly which draws the front slide 462 to which the fork 454 is secured forwardly, which moves the carrier member 428 forwardly until the teeth 446 mesh with the teeth of plate 448. When the carrier is thus held non-rotative, forward rotation of the sun gear 396 will cause rearward rotation of ring gear 426 and the vehicle will move backwardly.

For all forward driving, the lever 480 is pushed rearwardly which pushes the fork 454 rearwardly and slides the carrier teeth 452 over the front ends of the teeth of the sun gear 396. The teeth of the planet pinions 434, being still meshed one-third their length into the teeth of both the sun gear 396 and ring gear 426, a locked condition is provided wherein the tail shaft 400 must rotate in unison with the transmission output member 145.

If the engine is now speeded up past 400 R. P. M. the main clutch 70 engages, drives the booster ring gear 114 which starts revolving the booster sun gear 108 backwardly, which is immediately arrested by the roller brake 107, whereupon the carrier 99 rotates forwardly at reduced speed.

The carrier 99 is secured to the transmission input shaft 68, therefore both rotate at the same speed. The input shaft 68 being normally connected by the clutch 206 to the ring gear element 200 of the transmission gear set while the carrier element 202 is connected by the clutch 204 to the output member 145, both gear sets will be in series and both operating at reduced output member speed. This provides low gear or first speed and the engine to wheel ratio will be 11.4 to 1.

Now as soon as the vehicle starts moving, the auxiliary clutch 100 starts rotating, whereupon the weights 75 start moving out and compressing the engaging springs 92. There is an unvarying position of the weights and an unvarying length and stress of the springs for any given vehicle speed. Whether this stress will engage the auxiliary clutch 100 or not depends on the forward axial thrust of the booster ring gear 114. If this thrust is zero, as for instance when the vehicle is allowed to start itself on a steep down grade, the clutch 100 will engage almost immediately following the beginning of vehicle movement, the light spring 51 being overcome at a speed of less than 1 M. P. H. This is important, for it insures engine braking under any and all circumstances even when the engine is dead or idling and the main clutch 70 is consequently disengaged.

It also permits the engine to be started when the battery is dead by pushing the vehicle. Of course, after the engine is rotated thru the auxiliary clutch 100 by vehicle movement to a speed of 400 R. P. M., or more, the main clutch 70 will automatically engage.

If, on the other hand, a start is being made against vehicle resistance as is substantially always the case, then the booster ring gear will thrust forward in proportion to that vehicle resistance to oppose auxiliary clutch engagement, and its engagement will be proportionately delayed.

The booster clutch dry plate, the springs for engaging it, the weights for engaging the springs, and the helix angle of the booster ring gear teeth, are all so proportioned, however, that engagement of the clutch and consequent elimination of the booster gear as a factor in reducing speed and multiplying torque cannot be delayed to the point where the overall efficiency is too low. The arrangement is therefore such that no matter what ratio is in effect in the transmission gear-set, if maximum torque is being created as represented by the curve $w$, Fig. 16 and kept at maximum until the engine speed reaches $i=3600$ R. P. M.$=$ 160 foot pounds torque$=$663 pounds clutch engaging force, the centrifugal weight force will have brought the engaging stress of the clutch springs to $j=2250$ R. P. M.$=$663 pounds clutch engaging force, wherefore the two forces are balanced. If the engine speed increases further the engaging force rises and the disengaging force drops whereby clutch engagement becomes involuntary at the engine's maximum H. P. point, and by engagement it brings the engine from $i=3600$ R. P. M.$=$ 160 foot pounds torque to $k=2250$ R. P. M.$=186$ foot pounds torque.

When the clutch engages at $k=2250$ R. P. M. all load is removed from the ring gear and there is zero clutch disengaging force. When the clutch engages, the clutch springs become .0915" longer and therefore weaker, the clutch engaging force dropping from $j=663$ pounds to $l=585$ pounds which, according to the chart, enables the clutch to carry 220 foot pounds load.

If henceforth the vehicle resistance is such that the engine speed can rise above $k=2250$, the clutch capacity will rise beyond $l$ on the curve $t$, but if the vehicle resistance now happens to be such that the engine speed is caused to fall from $k$ toward $n$, then the clutch capacity will fall from $l$ toward $m$.

Assuming the latter condition to be in effect, when the engine speed falls to $n=1750$ R. P. M.$=$ 186 foot pounds, the carrying capacity of the clutch will have fallen to $m=186$ foot pounds, and since the torque being applied and the capacity of the clutch are now equal, any further reduction in speed will allow the clutch to disengage and the booster gearing to again become effective. The booster ring gear has sufficient axial movement when it assumes the load to push the clutch wide open, whereby there is no clutch drag while the gearing is in effect.

Thus the maximum engine torque kept the clutch 100 from engaging up to 2250 R. P. M. of the input shaft 68, but when it once engaged, the clutch carried the maximum torque until a reduction in speed of the input shaft 68 to 1750 R. P. M. occurred. This 23% overlap is desirable to prevent too frequent shifting from clutch to gear drive with its resulting wear.

The foregoing described operation of the booster gear and clutch was based on the maximum torque curve $w$ but it will be obvious that when power is generated which may be defined by a lesser torque curve, the clutch engaging force, rising along the curve $s$ will meet the lesser torque curve at a point short of $j$, the overlap being about equal in percentage to the overlap of curve $w$.

Obviously, by purposely first depressing, then releasing the accelerator, a torque curve may be created which will drop sharply at any desired speed to a clutch disengaging force line which will coincide with the line to which the clutch engaging force curve $s$ has risen, and the clutch will engage. In this way the booster clutch may be engaged and the booster gearing eliminated at will. Further, a sharp depressing of the accelerator when the booster clutch is engaged will raise the torque curve to a line which passes thru the point on the curve $t$ which represents the then existing clutch carrying capacity, whereby the booster clutch may be disengaged at will.

It will be seen that the booster gear set is controlled by balancing speed against torque. The transmission gear set is, however, adapted to change ratios in response to speed only. At 15 M. P. H., the centrifugal weights 214 have centrifugal force sufficient to overcome the weight return spring 228 plus the shift spring 260 and consequently the weights move out until the shift collar 224 closes the gap 232 and is stopped by contact with the clutch member 210.

In closing the gap 232, the shift collar 224 has moved the prop 230 and the ring 252 rearwardly, thereby compressing the springs 228 and 260 an amount equal to the gap. In closing the gap the weights have swung outwardly one-half of their total travel which aligned the plunger 370 with the lug 356 thereby completing an electric circuit thru the signal showing that a shift ought now to be made from underdrive to direct.

No shift will be made, however, as long as torque is being transmitted thru the clutch member 210, for altho the weight 214 is attempting to move thru the other half of its outward travel, it cannot do so against the frictional resistance in the splines 208 and jaws 244 under load, and while the spring 260 has now been compressed by the ring 252 to urge the clutch member 212 rearward, it cannot move because it is held to the clutch member 210 by the hooks 264 (see Fig. 17).

As soon as the signal, that a shift is possible, appears, the operator may momentarily release the applied torque by letting up on the accelerator pedal, whereupon the weights 214 will move outwardly the other half of their travel, thus pushing the clutch member 210 rearwardly far enough that its jaws 244 are slightly more than half out of mesh with the jaws 242 whereby, because of the beveled faces 270 and 274, the engine speed may quickly fall, the jaws 242 revolving slower than the jaws 244 by ratcheting over them.

When the jaws 244 moved far enough axially to be slightly over half out of mesh with the jaws 242, the hooks 264 permitted the jaws 250 to move axially far enough to be slightly less than half in mesh with the jaws 248, altho the spring 260 has now been stressed sufficiently by movement of the ring 252 to bias the jaws 250 for full depth entry into the jaws 248.

When the hooks 264 first allowed the spring biased jaws 250 to try to enter the ring gear jaws 248, the ring gear jaws 248 were revolving too fast for engagement, but the bevels 272 and 276 are such that the jaws 248 merely ratchet over the jaws 250.

During the first second of this shift up period, when both sets of jaws are thus ratcheting, and the clutch members 210 and 212 are being revolved by vehicle momentum, the engine speed may be raised, if desired, to provide a one way drive between the jaws 242 and 244, whereby the vehicle is still driven in underdrive. This would be done only in an emergency. If, on the other hand, the operator waits longer, preferably about three seconds, the engine speed will have dropped to the point where the jaws 248 have slowed down to the speed of the jaws 250, whereupon the spring 260 will slide the jaws 250 into full depth mesh with the jaws 248 and in doing so cause the hooks 264 to withdraw the jaws 244 completely out of mesh with the jaws 242.

This establishes a positive two way drive between the ring gear 176 and output member 145 and leaves no drive between the carrier and the output member as previously existed.

When the weights 214 moved all the way out, the circuit was broken at the point where the plunger 370 moved off of the lug 356. At this time the engine speed had not yet been lowered to a point where the second half of the shift was completed. The signal, however, would now have disappeared prematurely, that is as soon as ratcheting began and one way drives were established, had it not been for the thermostat 387, which expands to complete a ground connection for the signal thru screw 397 several seconds after one is completed by the weights and holds the connection several seconds after the weights break it. The screw 397 should preferably be adjusted to hold the ground connection for about three seconds after the connection thru lug 356 is severed.

Inasmuch as the input shaft 68 is normally connected to the ring gear 176 thru the overdrive clutch member 282 and the output member 145 has now been connected to the ring gear thru the member 212 of the direct drive clutch, the transmission gear-set is in direct drive, the ring gear rotating at input member and output member speed and the carrier idling at a lesser speed.

From the foregoing, it will be seen that the shift up of the transmission gear-set from underdrive to direct involves starting with a two way connection thru underdrive and none thru direct, then effecting a one way connection thru underdrive and a one way connection thru direct, then effecting a two way connection thru direct and none thru underdrive.

It will also be seen that the hooks 264 prevent the clutch 204 making a two way driving connection of the output member 145 with the faster ring gear and the slower carrier at the same time. Obviously, as between the ring gear and the carrier, either may have positive two way connection with the output member as long as the other has only a ratchet connection. This condition prevents freewheeling inasmuch as there never is a point in the transition period when the engine will not drive the vehicle and the vehicle will not drive the engine.

From the fact that the shift up of the direct drive clutch was possible when the centrifugal force of the weights 214 exceeded the stress of the weight return spring 228 plus the shift spring 260, it will be understood that a shift back down becomes possible when the spring 228 exceeds the centrifugal force of the weights 214 plus the shift spring 260. After a shift up, therefore, at 15 M. P. H., the vehicle speed must be reduced to about 11.8 M. P. H., to cause the weight to lose an amount of centrifugal force equal to double the stress of the shift spring 260 before a shift down will occur. The shift down will then be accomplished by repeating the shift up process except in the opposite direction.

At 30 M. P. H., the centrifugal weights 286 have centrifugal force sufficient to overcome the weight return spring 302 plus the shift spring 326 and consequently the weights move out until the shift collar 296 and washer 298 close the gap 306 and are stopped by contact with the clutch member 282.

In closing the gap 306, the washer 298 has moved the prop 304 and the ring 318 forwardly, thereby compressing the springs 302 and 326 an amount equal to the gap. In closing the gap the weights have swung outwardly one-half of their total travel which aligned the plunger 374 with the contact stud 350 thereby again completing an electric circuit thru the signal showing that a shift ought now to be made from direct to overdrive.

No shift will be made however, as long as torque is being transmitted thru the clutch member 282, for altho the weight 286 is attempting to move thru the other half of its outward travel, it cannot do so against the frictional resistance of the splines 280 and jaws 312 under load, and while the spring 326 has now been compressed by the ring 318 to urge the clutch member 284 forward, it cannot move because it is held to the clutch member 282 by the hooks 330 (see Fig. 8).

As soon as the signal, that a shift is possible, appears the operator may again momentarily release the applied torque, whereupon the weights 286 will move outwardly the remaining half of their travel, thus pushing the clutch member 282 forwardly far enough that its jaws 312 are slightly more than half out of mesh with the jaws 310 whereby, because of the beveled faces 336 and 340, the engine speed may be let down, the jaws 312 revolving slower than the jaws 310 by ratcheting over them.

When the jaws 312 moved far enough axially to be slightly over half out of mesh with the jaws 310, the hooks 330 permitted the jaws 316 to move axially far enough to be slightly less than half in mesh with the jaws 314, altho the spring 326 has now been stressed sufficiently by movement of the ring 318 to bias the jaws 316 for full depth entry into the jaws 314.

When the hooks 330 first allowed the spring biased jaws 316 to try to enter the carrier jaws 314, the carrier jaws 314 were revolving too slow for engagement, but the bevels 338 and 342 are such that the jaws 316 merely ratchet over the jaws 314.

During the first second of the shift up period, when both sets of jaws are thus ratcheting, and the clutch members 282 and 284 are being revolved by engine momentum, the engine speed may be raised, if desired, to provide a one way drive between the jaws 312 and 310 whereby the vehicle is still driven in direct drive. This would be done only in an emergency. If, on the other hand, the operator waits longer, preferably about three seconds, the engine speed will have dropped to a point where the jaws 316 have slowed down to the speed of the jaws 314, whereupon the spring 326 will slide the jaws 316 into full depth mesh with the jaws 314 and in doing so cause the hooks 330 to withdraw the jaws 312 completely out of mesh with the jaws 310. This establishes a positive two way drive between the carrier member 162 and input shaft 68 and leaves no drive between the ring gear and the shaft 68 as previously existed.

When the weights 286 moved all the way out, current was broken at the point where the plunger 374 moved off the contact stud 350. The thermostat 387 again holds the signal in effect until ample time has elapsed for the shift to be completed.

Inasmuch as the input shaft 68 is now connected to the carrier thru clutch member 284 and the output member 145 is still connected to the ring gear, thru clutch member 212, the transmission gear-set is now in overdrive, the output member rotating faster than the input member.

From the foregoing it will be seen that the shift up from direct to overdrive involves starting with a two way connection thru direct and none thru overdrive, then effecting a one way connection thru direct and a one way connection thru overdrive, then effecting a two way connection thru overdrive and none thru direct.

It will also be seen that the hooks 330 prevent the clutch 206 making a two way driving connection of the input shaft 68 with the faster ring gear and slower carrier at the same time.

Obviously, as between the ring gear and the carrier, either may have positive two way connection with the input shaft as long as the other has only a ratchet connection. This condition prevents freewheeling, inasmuch as there never is a point in the transition period when the engine will not drive the vehicle or the vehicle drive the engine.

From the fact that the shift up of the overdrive clutch was possible when the centrifugal force of the weights 286 exceeded the stress of the weight return spring 302 plus the shift spring 326 it will be understood that a shift back down becomes possible when the spring 302 exceeds the centrifugal force of the weights 286 plus the shift spring 326.

After a shift up therefore, at 30 M. P. H., the vehicle speed must be reduced to about 23 M. P. H., to cause the weights to lose that amount of centrifugal force equal to double the stress of the shift spring 326 before a shift down will occur. The shift down will then be accomplished by repeating the shift up process except in an opposite direction.

The manner in which the booster gear set cooperates with the transmission gear-set to meet different driving conditions may best be illustrated by several examples, reference being had to the chart Fig. 16.

Whenever the vehicle comes to rest, the booster gear-set and the transmission gear-set are automatically connected in series and the engine to wheel ratio is 11.4 to 1, which is low gear.

As a first example, assume that the driver wishes to bring the vehicle from rest to its maximum speed in as short a period as possible. He will of course, create the maximum torque curve $w$. At 15 M. P. H., the engine reaches $a=1978$ R. P. M. and the transmission input shaft 68, being driven thru the booster gear set at 1 to 1.6 ratio will be revolving $b=1236$ R. P. M. and the transmission weights 214 will be revolving $c=838$ R. P. M., the speed at which the weights start moving out.

At this point, 15 M. P. H., the signal indicates that the transmission gear-set should be shifted from underdrive to direct by releasing the applied power. Let us assume the driver ignores the signal and maintains the torque at maximum. When the engine reaches a speed $i=3600$ R. P. M., the booster gear weights 75 will be at $j=2250$ R. P. M., the speed with transmission gear-set in underdrive being now about 27 M. P. H.

At $i$ the engine torque has dropped to 160 foot pounds and the helical gear thrust clutch disengaging force is 663 pounds. The booster weights 75 have meantime increased the stress of springs 92 along the curve $s$ until at $j$ the stress is 663 pounds. The slightest further advance in engine speed will therefore lower the disengaging and raise the engaging force of clutch 100 and it will engage.

When clutch 100 thus engages at 27 M. P. H., the engine speed and torque will be altered from $i=3600$ R. P. M.$=160$ foot pounds torque to $k=2250$ R. P. M.$=186$ foot pounds torque, the engine speed and weight speed being now equal, and, since the drive is now in direct thru the booster gear-set, and in underdrive thru the transmission gear-set, the engine-to-wheel ratio is 7.12 to 1, hereinbefore designated as speed second.

If the operator still has not released the applied power, the engine will again rise in speed from $k=27$ M. P. H., to $i=44$ M. P. H., still in speed second. Further changes in ratio may now be made only by release of the applied torque. If this is done the torque will fall from $i$ to $i_1$, and the engine speed will begin to drop. If the engine speed is allowed to drop from 3600 R. P. M. only as far as $e_1=2443$ R. P. M. and the power is then reapplied and the torque brought to $e$, the transmission gear set will have shifted to direct, and, the booster gear-set being now in direct, the engine-to-wheel ratio will be 4.82 to 1 hereinbefore called speed high.

By now raising the engine speed from $e=2443$ R. P. M. to $i=3600$ in speed high ratio, the vehicle speed is raised from 44 M. P. H., to 65 M. P. H., then by again reducing the engine speed to $e_1=2443$ R. P. M. and reapplying the power so as to bring the torque to $e$, the transmission gear-set will have shifted to overdrive and by bringing the engine speed to 3600, the vehicle speed will be 96 M. P. H.

If, however, the engine speed had been allowed to drop from $i$ to $f_1=1676$ R. P. M., before power was reapplied to bring the torque to $f$, the transmission gear-set would have shifted from underdrive directly to overdrive where the engine-to-wheel ratio is 3.27 to 1. If after such change the engine speed were raised to 3600 R. P. M., the vehicle speed would be 96 M. P. H.

The foregoing first example was given to show that, altho a driver may ignore the shift up signal, the result is not serious, the effect being that he may be speeding his engine faster than necessary to attain his desired result.

As a second example, to show how, for a similar desired result, the shifts are preferably made to keep the engine operating at the lower speeds where its torque is higher, assume that the second driver also wishes to bring the vehicle speed from rest to maximum in as short a time as possible. He will also create the maximum torque curve $w$. When the engine speed reaches $a=1978$ R. P. M., the transmission input shaft 68, driven thru the 1.6 to 1 booster gear ratio will revolve $b=1236$ R. P. M., and the transmission weights 214 now revolved thru the transmission gear ratio 1.474 to 1, will be turning $c=838$ R. P. M., and the signal will indicate that a shift up should be made.

The driver now releases the accelerator, and the torque drops from $a$ to $a_1$. Since there is now no axial thrust in the booster ring gear 114, the booster gear set immediately shifts up by engagement of clutch 100 and assists slightly in reducing the engine speed. If he waits about three seconds the engine speed will have dropped from $a_1=1978$ R. P. M. to $c_1=838$ R. P. M. The transmission clutch 204 now shifts up and the signal disappears.

The booster gear set and the transmission gear set are now both in direct for an instant, but when maximum engine torque is now reapplied to bring it from zero at $c_1$ to maximum at $c$, the booster clutch 100 disengages just as the rising torque crosses the curve $t$, and instead of the engine speed and torque arriving at $c$, it arrives at $b$, where the engine speed is 1236, altho the transmission input shaft 68 still revolves $c=838$ R. P. M.

The booster set being now in gear and the transmission set in direct, the overall ratio is 7.72 to 1 which has been designated torque second. This shift was made at 15 M. P. H.

With torque second ratio in effect, the engine speed rises from $b=1236$ to $d=2472$ R. P. M. whereby the vehicle speed is brought from 15 to 30 M. P. H., at which speed the overdrive weights 286 revolve 1676 R. P. M. and move out far enough to indicate by the signal that a shift to overdrive had preferably now been made. The driver should now again completely release the accelerator, allowing the torque to drop from $d$ to $d_1$.

Due to lack of torque reaction of the booster ring gear, the booster clutch now engages and assists slightly in reducing the engine speed. By pausing for about three seconds, the engine speed will have dropped from $d_1=2472$ R. P. M. to $g_1=1138$, the speed at which the input shaft 68 must be revolving to drive the overdrive weights at 1676 R. P. M. thru the overdrive ratio.

When, therefore, the engine speed reaches 1138, the transmission overdrive clutch 206 will engage and the signal will disappear for the second time.

The booster gear set and the transmission gear set are again both in direct for an instant, but when maximum engine torque is now reapplied, to bring it from zero at $g_1$ to maximum at $g$, the booster clutch 100 again disengages just as the torque crosses the curve $t$, and instead of the engine speed and torque arriving at $g$, it will arrive at $h$, where the engine speed is 1820 R. P. M., but the transmission input shaft 68 will still be at $g=1138$ R. P. M.

The booster gear set being now in gear and the transmission gearing in overdrive, the overall ratio is 5.24 to 1 which has been denominated torque high. This shift occurs at 30 M. P. H.

With torque high ratio in effect, the engine speed rises from $h=1820$ to $i=3600$, whereby the vehicle speed is brought from 30 M. P. H., to 59 M. P. H., and the booster weights 75 will be revolving $j=2250$ R. P. M.

At the slightest increase in engine speed, the booster clutch engaging force rises above $j=663$ pounds and the booster ring gear disengaging force falls below $i=663$ pounds and the booster clutch engages, whereupon the engine speed will drop to $k=2250$ and the drive will be 1 to 1 thru the booster clutch and .6786 to 1 thru the overdrive connection of the transmission gear set, whereby the transmission output member 145 revolves $$\frac{1}{.6786}$$

or 1.474 times as fast as the engine, which is $1.474 \times 2250 = 3320$ R. P. M.

If the engine speed is again raised from 2250 to 3600 with the overdrive ratio in effect, the vehicle speed will again be raised to 96 M. P. H.

The two examples given pertained to the use of the transmission for maximum acceleration, and it should be noted that in the second example the average engine speed was lower. It will be seen, however, that even in the second example, after each shift up in the transmission gear set, the booster gear was drawn into series with the transmission gear because of the reapplication of maximum torque, whereby the dry plate clutch 100 was twice disengaged and reengaged in bringing the speed from 0 to 96 M. P. H., which equals the practice in conventional hand shift transmissions with foot clutches.

The cases, however, where it is desirable that the vehicle be brought from rest to maximum speed in the fewest possible seconds are rare, so, in order to show the better practice in bringing the vehicle from rest to maximum speed, a third example is given as follows:

The driver creates a torque curve $v$ which at its highest point is but 95 foot pounds, or about half the maximum capacity of the engine.

After a slight spurt in low gear, he allows the curve to fall off to $q$, where the torque is about 55 foot pounds and the engine speed 944 R. P. M. The booster weight 75 now revolves $p=590$ and the vehicle speed is 7 M. P. H.

Since $p=230$ pounds=the clutch engaging force of springs 92 and $q=230$ pounds=the clutch disengaging force of booster ring gear 114, the booster clutch 100 will engage and cause the engine speed to be lowered from 944 to 590 which is the weight speed. If the torque has been further dropped, say to about 26 foot pounds, engagement of clutch 100 and elimination of the booster gear will occur at $r$ with 26 foot pounds torque still applied, the transmission input shaft 68 revolving 590 R. P. M. and the vehicle speed at 7 M. P. H. At the instant of engagement of clutch 100, the force of the springs 92 dropped from $p=230$ pounds to $x=172$ pounds, at which pressure the carrying capacity of the clutch 100 is still about 65 foot pounds, which is more than one-third of the maximum torque of the engine. Since the booster gear set is in direct drive and the transmission gear set in underdrive, the overall ratio is 7.12 to 1 which has been called speed second.

If power is now applied, the torque may be raised gradually to $b_2$ where the torque is 80 foot pounds, the speed of the input shaft 62 is 1236 and the vehicle speed 15 M. P. H., and the signal for a shift up appears.

Releasing the accelerator now drops the torque to $b_1$, lowers the engine speed to $$\frac{1}{1.474} \text{ times } 1236 = 838 = c_1$$

whereupon the transmission clutch engages and the signal disappears. Since the booster gear set is in direct drive and the transmission gear set also in direct drive, the overall ratio is 4.82 to 1 which has been called speed high. The torque is now reapplied and brought to $c_2$, about 52 foot pounds then raised along the torque curve $v$ to $f_2=1676$ where the torque is 107 foot pounds, the vehicle speed in direct is 30 M. P. H., whereupon the signal for a shift to overdrive appears.

By again releasing the accelerator so the torque will drop from $f_2=107$ foot pounds to $f_1=0$, then allowing the engine speed to drop to $.6786 \times 1676 = g_2 = 1138$ R. P. M., the transmission overdrive weights 286 will move out and the signal will disappear and the mechanism will be in overdrive with overall ratio of 3.27 to 1 and with engine speed $g_2=1138$ R. P. M. and vehicle speed 30 M. P. H.

After the shift up the engine speed may be raised from 1138 to 3600, bringing the vehicle speed from 30 to 96 M. P. H. in overdrive, without once disengaging the dry plate clutch 100. Thus in this third example there was one engagement and no subsequent disengagement of the clutch 100 in bringing the vehicle from rest to 96 M. P. H.

By operating his accelerator to create the torque curve $v$, it may be said that the driver first applied a spurt of half the engine's maximum power in low gear to start the vehicle, then let the power trail off until at 7 M. P. H. only about one-sixth maximum engine power was being applied, after which he so gradually increased the engine power that at no time did it rise above the curve $t$, whereby he raised the vehicle speed in second gear from 7 to 15 M. P. H., then by letting up on the accelerator pedal he shifted to high, then raised the vehicle speed from 15 to 30 M. P. H. in high, being careful not to apply torque above the curve $t$, then again let up on the accelerator to shift from high to overdrive, then continue in overdrive to 96 M. P. H.

The reason for the novel spring and weight arrangement of the clutch 100 will now be more clear. When centrifugal weights are arranged as in general practice, the force which they will produce, to engage a clutch, increases with the square of the R. P. M. Such force curves are shown at $u$ and $y$, Fig. 16.

If there should be created a clutch engaging force $j=663$ pounds at 2250 R. P. M. to just balance a clutch disengaging force $i$ at 3600 R. P. M., as hereinbefore stated to be a requirement, with weights of conventional design, the curve $u$ would represent the force available at various R. P. M. to keep the clutch from engaging and the curve $y$ would represent the force available at various R. P. M. to keep the clutch engaged once it had engaged. It is evident that if curves $u$ and $y$ were substituted for $s$ and $t$ respectively, the performance illustrated by the torque curve $v$ would be impossible, for most of the curve $v$ lies above instead of below the curves $u$ and $y$.

Thus, when at 7 M. P. H. the driver had dropped his torque to $r$ and thereby eliminated the booster gear in favor of the booster clutch, he could have raised the torque to, but not above, $x=42$ foot pounds without putting booster gear back into play, but had his weights been conventional as expressed by curves $u$ and $y$, he could have raised his torque to, but not above, 8 foot pounds without bringing his booster gearing back into play.

The need for the special booster weight and spring arrangement is now apparent, for it is quite essential that a reasonable amount of torque may be applied at the lower vehicle speeds without constantly pulling a gear set back into play when the operator has no desire for rapid acceleration, nor any hill climbing to do, and therefore no need of the torque multiplying gears.

The curve $v$ represents substantially the average practice in accelerating vehicle speed, i. e., by raising the torque gradually as the vehicle responds. If, however, at any time during this gradual acceleration, the need for more rapid acceleration suddenly arises, a spurt of power which will throw an upward loop in curve $v$ high enough to rise up and cross the curve $t$ will bring in the booster gear and reduce the ratio from overdrive to high, from high to second, or, from second to low as the case may be. This upward loop in curve $v$ must, however, cross the curve $t$ ahead of the point $m$, that is, if driving in second gear faster than 22 M. P. H., the booster gear may be no longer brought into play to provide low gear, and if driving in high gear faster than 32 M. P. H., the booster gear may no longer be brought into play to provide second gear, and if driving in overdrive faster than 47 M. P. H., the booster gear may no longer be brought in to provide high.

The reason for the above arrangement is, that when driving in overdrive, for instance, at 47 M. P. H., the input shaft 68 and the engine will be revolving $m=1750$. If, now the booster gear could be brought back into play the engine speed would have to rise to $1.6 \times 1750 = 2800$ R. P. M. Since this is within 22% of the maximum H. P. point of 3600 R. P. M., a shift up after this speed would not be justified for the reason, that the falling off of the torque and the time and wear incident to the shift would not justify making it.

From the foregoing it will be seen that a high to overdrive shift may be effected at 30 M. P. H., but overdrive back to high not after 47 M. P. H.; second to high at 15 M. P. H., but high back to second, not after 32 M. P. H., while a shift from low to second may be made anytime after about 1 M. P. H., but from second back to low not after 22 M. P. H. This is as it should be, for there is no advantage in shifting back down to a lower ratio, after a vehicle speed has been attained which would require too high an engine speed thru the lowered ratio to effect any gain.

It will of course be understood that in shifting from overdrive back to high as above stated, the overdrive clutch in the transmission housing, being responsive to speed only, does not shift back down at 47 M. P. H., but retains its overdrive speed increasing gear connection while the booster gear set draws down into its speed reducing gear connection which reduces the overall ratio thru both sets to a ratio not far from the 1 to 1 ratio had when both gear sets are in direct drive. The same is true when any other gear ratio is reduced by a torque application which brings in the booster gear.

In driving thru mountainous country, the overdrive lock out lever 482 should be drawn top forward, by any suitable dash control knob whereby the collar 377 slides over the weights 286 and prevents any shift from high to overdrive. This is more easily done before the weights have moved out to make the overdrive connection, but may be done thereafter without harmful result. Both driving and engine braking are improved by locking out the overdrive in mountain driving.

In driving in congested traffic the overdrive lock out may preferably, tho not necessarily, be used. In zones where a 15 M. P. H. limit is imposed, and where frequent stops at traffic signals are required, an operator may preferably accelerate from 0 to 15 M. P. H. in low gear, then shift directly to high, as is now done by expert drivers with hand shift transmissions. This is readily done in the device herein shown by creating a torque curve such as *v* which will not drop as low at 15 M. P. H. as the curve *s* has risen at that time.

After this, as much as 90 foot pounds or half the full engine power could be applied without rising above the curve *t* and bringing back the booster gear. This 90 foot pounds will be much more than may be applied in such situations without further accelerating the vehicle beyond the legal speed.

By this method the acceleration is quite rapid up to 15 M. P. H., but there is not now any law stating how quickly this speed may be acquired but only that it be not exceeded in certain districts.

Since all changes in gear ratio are accomplished automatically influenced somewhat by manipulation of the accelerator pedal, the clutch pedal is, of course, not needed for its conventional function and may therefore preferably be retained and coupled to the brake pedal so that either or both pedals may be used to apply the brakes.

With this arrangement the operator who has been accustomed to a foot operated clutch, may still, if he forgets, apply the brakes with his right foot but may gradually train himself to applying the brake with his left foot, after which he need never, in driving, remove his right foot from the accelerator, nor his left foot from the brake.

The clutch and booster gear mechanism, being substantially like that shown in my copending application Serial No. 257,052, filed February 18, 1939, is not herein claimed, and is included in the present application only because of its close cooperation with the transmission mechanism enclosed in the housing 30, hereinbefore described and now defined in the following claims.

I claim:

1. The combination, in transmission gearing, of two gear connected rotatable elements, the one rotatable at a different speed from the other, a rotatable member having clutch means normally engaged with one of said elements but adapted to shift and engage the other of said elements, said clutch means being shiftable by light force only when not under load, a speed responsive device adapted to apply said light force, a resilient means interposed between said speed responsive means and said clutch adapted to yield to said light force when said clutch is under load and permit said speed responsive means to move part way without shifting said clutch, and a signal operative by said speed responsive means upon part way movement when said clutch is under load, but again inoperative upon full movement after said clutch has been shifted.

2. In a transmission mechanism, the combination of two elements gear connected for rotation at different speeds, a rotatable member carrying clutch means normally engaged with one of said elements but adapted to be shifted by relatively small force when not under load but a much greater force when under load, to engage the other element, a centrifugal weight movable outwardly and capable at a certain speed to provide said small force, a spring interposed between a part of said centrifugal weight and said clutch adapted to yield to said small force when said clutch is under load but to return to normal thereby shifting said clutch when said load is removed, means movable by outward movement of said weight adapted to abut said clutch when said clutch is under load to stop outward movement of the weight when part way out, a signalling device adapted to be made operative when said part way movement has taken place and again inoperative when said weight moves the rest of the way out and said clutch engages.

3. In combination, two rotatable elements with gearing connecting them for rotation at different speeds, a rotatable member carrying clutch means normally engaged with one of said elements but adapted to be shifted by a relatively small force when not under load but only by a much greater force when loaded, to engage the other element, a centrifugal weight movable outwardly and capable at a certain speed to provide said small force, means including said clutch when under load to stop said weights when part way out, and a signalling device including an electric switch operative to be closed when said weights are at the part way position and to again be opened when said weights move farther out.

4. The combination of two rotatable elements having gearing connecting them for rotation at different speeds, a rotatable member having clutch means normally engaged with one of said elements but adapted to be shifted by a relatively small force when not under load but by a much greater force when loaded, to engage the second element, a weight member movable outwardly by centrifugal force and capable at a certain speed to provide said small force, a weight return spring for moving said weight inwardly, means including said clutch when engaged with the first element and under load to stop said weight when part way out, means including said clutch when engaged with the second element and under load to stop said weight when moved part way in by said return spring, and a signalling device inoperative when said weight is either clear in with the clutch normal or, clear out with the clutch shifted.

5. In combination with two gear connected elements adapted for rotation at different speeds, a rotatable member carrying clutch means normally drivably engaged with one of said elements, but adapted to be shifted to engage the other element by a relatively small force when not under load but only by a much greater force when loaded, a centrifugal weight movable outwardly and capable at a certain speed to provide said small force, means including said clutch to stop said weights when part way out, and a signalling device including an electric switch closable by movement of said weight to the part way position and again operable when said weights move all the way out, and a second switch closable by heat from current flowing thru the first switch and kept closed by said heat for a period after the first switch opens.

6. Transmission mechanism comprising, two gear connected elements rotatable at different speeds, a clutch normally having a two way driving connection with one of said elements and no driving connection with the second element but adapted to be shifted to an intermediate position where it has a one way drive connection with each of said elements whereby one element may rotate faster and the other slower than the clutch, and to a third position where it has a two way driving connection with the second said element and none with the first, said clutch being shiftable by a small force when not under load and by a much larger force when loaded, a centrifugal weight adapted to move outwardly and capable at a certain speed to provide said small force, means including said clutch under load whereby said weight is stopped when part way out without having moved said clutch, said weight being adapted to move all the way out when the load is removed from said clutch and thereby move said clutch to its intermediate position, a spring stressed by said weight moving to its out position to shift said clutch to its third position, and a signal including a switch closable by movement of said weight to its part way position and openable by movement of said weight to its clear out position.

7. The structure defined in claim 6 with a second switch thermostatically closed by current passing thru the first switch and thermostatically held closed for several seconds after said first switch has opened, whereby said signal remains in effect until said clutch shifts from the intermediate position to the third position.

8. In a power transmitting device, two rotatable elements, gearing permanently connecting said elements whereby one always rotates faster than the other, a rotatable member adapted to be connected alternately to one or the other of said elements, a jaw clutch portion on each of said elements, a clutch mechanism on said member comprising two axially slidable jaw clutch parts, one for engaging each said jaw clutch portion, a centrifugal weight, a weight return spring under stress adapted to be overcome by said weight moving outwardly at a predetermined speed and to overcome said weight to move it inwardly below said speed, and a shifting spring adapted to be stressed by outward movement of said weight and applied to shift one axially slidable clutch part into engagement with its jaw clutch portion and to be stressed by release of said return spring and applied to shift the other axially slidable clutch part into engagement with its clutch portion, said shifting spring, when stressed, being capable of moving said axially slidable clutch parts when they are not under load but incapable of moving them when they are loaded, said centrifugal weight and said return spring being always free to move against the resistance of said shifting spring whether said clutch parts are loaded or not.

9. The structure of claim 8, wherein the teeth of the jaw clutch portions on the elements, and the teeth of the axially slidable jaw clutch parts, are so beveled on their end faces that when they are engaged to half depth they provide a one way drive, and when engaged beyond half depth they provide a two way drive.

10. The structure of claim 8, wherein the teeth of the jaw clutch portions on the elements, and the teeth of the axially slidable jaw clutch parts, are so beveled on their end faces that when they are engaged to half depth they provide a one way drive, and when engaged beyond half depth they provide a two way drive, and wherein there is a means extending from one axially slidable clutch part to the other whereby, when the teeth of one said part enter half depth into the teeth of its clutch portion, it draws the teeth of the other slidable clutch part from full to half depth in its clutch portion.

11. The structure of claim 8, wherein the teeth of the jaw clutch portions on the elements, and the teeth of the axially slidable jaw clutch parts, are so beveled on their end faces that when they are engaged to half depth they provide a one way drive, and when engaged beyond half depth they provide a two way drive, and, wherein there is a means connecting the two axially slidable clutch parts whereby the teeth of neither of said clutch parts may enter to more than half depth into the teeth of its mating clutch portion without drawing the teeth of the other of said clutch parts to less than half depth in the teeth of its mating clutch portion.

12. The structure of claim 8, wherein the teeth of the jaw clutch portions on the elements, and the teeth of the axially slidable jaw clutch parts, are so beveled on their end faces that when they are engaged to half depth they provide a one way drive, and when engaged beyond half depth they provide a two way drive, and wherein one slidable clutch part has its teeth normally entered full depth in the teeth of its mating clutch portion and the centrifugal weight has means cooperating with said part made operative upon movement of the weight from the "in" to the "out" position to positively move the fully entered teeth to the half way position, and cooperating with said shifting spring to resiliently bias the entering teeth for entry into the full depth position.

13. The structure of claim 8, wherein the teeth of the jaw clutch portions on the elements, and the teeth of the axially slidable jaw clutch parts, are so beveled on their end faces that when they are engaged to half depth they provide a one way drive, and when engaged beyond half depth they provide a two way drive, and wherein one slidable clutch part normally has its teeth fully entered in the teeth of its mating clutch portion, and the other slidable clutch part normally has its teeth fully disengaged from the teeth of its mating clutch portion, and the centrifugal weight has means cooperating with the slidable clutch parts, operative upon movement of the weight from either of its positions to the other, to positively move the fully engaged teeth to the half depth position and resiliently bias the fully disengaged teeth for entry into the full depth position.

14. In a power transmission mechanism, a gear-set, two elements connected thru said gear-set to rotate at different speeds, a rotatable member adapted for connection alternately to one or the other of said elements, and a clutch for making said connections comprising, axially spaced jaw clutch portions on said elements, axially slidable jaw clutch parts on said member spaced apart a distance axially less than said portions, whereby when one said part is engaged with one said portion the other said part and portion are completely disengaged, a stop controlling the axial spacing of said parts to less but not more than said distance, a ratcheting spring and a shifting spring, both normally stressed and positioned to urge said parts apart to said distance, a weight operable by centrifugal force at a predetermined speed from its "in" to its "out" position, a weight return spring stressed to urge the weight to the "in" position, means thru which the movement of said weight from its "in" to its "out" position progressively moves one end of the shift spring away from its clutch part and toward the other clutch part, means thru which the movement of said return spring, when moving said weight back to the "in" position, progressively moves the other end of said shift spring away from its clutch part and toward the other clutch part, means thru which movement of said weight from an intermediate to its "out" position pushes the one clutch part when it is fully engaged with its clutch portion, half out of mesh, and means thru which movement of said return spring, in moving said weight from an intermediate to its "in" position, pushes the other clutch part when it is fully engaged with its clutch portion, half out of mesh, the engaging end faces of said clutch parts and clutch portions being so beveled that they provide a one way drive when half meshed and a two way drive when more than half meshed, and said shift spring when at its maximum stress is incapable of moving said clutch parts when under load but capable of moving them when not under load.

15. The structure defined in claim 14 wherein there is an electric switch, closable by movement of the weight to the intermediate position, and a signal operative by closing of said switch.

FREDERICK W. COTTERMAN.